(12) United States Patent
Horvitz et al.

(10) Patent No.: US 7,979,252 B2
(45) Date of Patent: Jul. 12, 2011

(54) SELECTIVE SAMPLING OF USER STATE BASED ON EXPECTED UTILITY

(75) Inventors: Eric J. Horvitz, Kirkland, WA (US); Ashish Kapoor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 11/766,547

(22) Filed: Jun. 21, 2007

(65) Prior Publication Data

US 2008/0319727 A1    Dec. 25, 2008

(51) Int. Cl.
G06G 7/48    (2006.01)
(52) U.S. Cl. .......................................................... 703/6
(58) Field of Classification Search ........................ 703/6
See application file for complete search history.

(56) References Cited

U.S. PATENT DOCUMENTS

| | | |
|---|---|---|
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,812,865 A | 9/1998 | Theimer et al. |
| 6,353,398 B1 | 3/2002 | Amin et al. |
| 6,466,232 B1 | 10/2002 | Newell et al. |
| 6,513,046 B1 | 1/2003 | Abbott, III et al. |
| 6,549,915 B2 | 4/2003 | Abbott, III et al. |
| 6,672,506 B2 | 1/2004 | Swartz et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |

(Continued)

FOREIGN PATENT DOCUMENTS

WO     9800787     1/1998

(Continued)

OTHER PUBLICATIONS

A. Kapoor et al., "Selective Supervision: Guiding Supervised Learning with Decision-Theoretic Active Learning", Jan. 2007, Twentieth International Joint Conference on Artificial Intelligence, six unnumbered pages.*

(Continued)

Primary Examiner — Jason Proctor
Assistant Examiner — Russ Guill
(74) Attorney, Agent, or Firm — Wolf, Greenfield & Sacks, P.C.

(57) ABSTRACT

Model enhancement architecture that provides selective sampling of data to enhance model performance where model testing is deemed to be poor. Sampling can include direct interaction with the user while the user is logged-in to the computing system. The system can be used to infer a computer user's current interruptability based on computer activity and relevant contextual information. Personalized models can then be created that are utilized to determine a cost of interruption and an expected utility. A modeling component is provided that builds and runs models based on data. The data can be any type of data such as application data, user profile data, tracking data, user state data, user situation data, and so on. A sampling component samples the data based on failure analysis of the model. The architecture is a utility-centric approach to gathering data to maximally enhance the current model.

20 Claims, 18 Drawing Sheets

U.S. PATENT DOCUMENTS

| | | | |
|---|---|---|---|
| 6,837,436 B2 | 1/2005 | Swartz et al. | |
| 6,842,877 B2 | 1/2005 | Robarts et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,171,378 B2 | 1/2007 | Petrovich et al. | |
| 7,195,157 B2 | 3/2007 | Swartz et al. | |
| 7,233,933 B2 * | 6/2007 | Horvitz et al. | 706/21 |
| 7,385,501 B2 | 6/2008 | Miller et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2004/0201500 A1 | 10/2004 | Miller et al. | |
| 2005/0034078 A1 | 2/2005 | Abbott et al. | |
| 2005/0266858 A1 | 12/2005 | Miller et al. | |
| 2005/0272442 A1 | 12/2005 | Miller et al. | |
| 2006/0010206 A1 | 1/2006 | Apacible et al. | |
| 2006/0019676 A1 | 1/2006 | Miller et al. | |
| 2007/0006098 A1 | 1/2007 | Krumm et al. | |
| 2007/0038438 A1 | 2/2007 | Cho et al. | |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2009/0006297 A1 | 1/2009 | Horvitz et al. | |
| 2009/0055752 A1 | 2/2009 | Abbott et al. | |
| 2010/0262573 A1 | 10/2010 | Abbott et al. | |

FOREIGN PATENT DOCUMENTS

| | | |
|---|---|---|
| WO | 03012704 | 2/2003 |
| WO | 1020070049416 | 5/2007 |

OTHER PUBLICATIONS

N. Roy et al., "Toward Optimal Active Learning Through Sampling Estimation of Error Reduction", 2001, Eighteenth International Conference on Machine Learning, eight unnumbered pages.*

Vijay S. Iyengar et al., "Active Learning using Adaptive Resampling", 2000, Proceedings of the sixth ACM SIGKDD international conference on Knowledge discovery and data mining, pp. 91-98.*

Ashish Kapoor et al., "Principles of Lifelong Learning for Predictive User Modeling," Jul. 25, 2007, Proceedings of 11th International Conference on User Modeling, Lecture Notes in Computer Science, vol. 4511, Springer, pp. 37-46.*

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al.. The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et at., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearabe Information Spaces, Proceedings of theVirtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996, 3 pages.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

[Droppo and Acero, 1998] J. Droppo and A. Acero. Maximum a posteriori pitch tracking. In International Conference on Spoken Language Processing, 1998.

[Evgeniou et al., 2000] T. Evgenrou, M. Pontil, and T. Poggio. Regularization networks and support vector machines, Advances in Computational Mathematics, 13(1): 1-50, 2000.

[Freund et al., 1997] Y. Freund, H. S. Seung, E. Shamir, and N. Tishby. Selective sampling using the query by committee algorithm. Machine Learning, 28(2-3), 1997.

[Kapoor, 2006] A. Kapoor. Learning Discriminative Models with Incomplete Data. PhD thesis, Massachussetts Institute of Technology, 2006.

[Lawrence et al., 2002] N. Lawrence, M. Seeger, and R. Herbrich. Fast sparse Gaussian process method: Informative vector machines. 15, 2002.

[MacKay, 1992] D. Mackay. Information-based Objective functions for active data selection, Neural Computation, 4(4), 1992.

[McCallum and Nigam, 1998] A. K. McCallum and K. Nigam. Employing EM in pool-based active learning for text classification. In International Conference on Machine Learning, 1998.

[Minka, 2001] T. P. Minka. A Family of Algorithms for Approximate Bayesian Inference. PhD thesis, Massachussetts Institute of Technology, 2001.

[Muslea et al., 2002] I. Muslea, S. Minton, and C. A. Knoblock. Active + semi-supervised learning = robust multi-view learning. In International Conference on Machine Leaerning, 2002.

[Seeger, 2004] M. Seeger. Gaussian Processes for machine learning. International Journal of Neural Systems, 14(2), 2004.

[Sindwani etal., 2005] V. Sindhwani, W. Chu, and S. S. Keerthi. Semi-supervised Gaussian processes. Technical Report YRL.2005-60, Yahoo! Research Labs, 2005.

[Sollich, 1999] P. Sollich. Probabilistic methods for support vector machines. Neural Information Processing Systems, 12, 1999.

[Tong and Koller, 20001 S. Tong and D. Koller. Support vector machine active learning with applications to text classification, In International Conference on Machine Learning, 2000.

[Zhu et al. 20031 X. Zhu, J. Lafferty, and Z. Ghahramani, Combining active learning and semi-supervised learning using gaussian fields and harmonic functions. In Workshop on The Continuum from Labeled to Unlabeled Data in Machine Learning and Data Mining atICML, 2003.

Fogarty, J., Hudson, S.E., Lai, J.: Examining the Robustness of Sensor-Based Statistical Models of Human Interruplabiity. Proceeding of CHI (2004).

Horvitz, E.: Principles of Mixed-Initiative User Interface. ACM SIGCHI Conference on Human Factors in Computing Systems (1999).

Horvitz, E., Apacible, J.: Learning and Reasoning about Interruption, Intl. Conference on Multimodal Interfaces (2003).

Horvitz, E., Apacible, J., Koch, P. BusyBody: Creating and Fielding Personalized Models of the Cost of Interruption. Conference on Computer Supported Cooperative Work (2004).

Horvitz, E., Jacobs, A.; Hovel, D.: Attention-Sensitive Alerting. Uncertainty in Artificial Intelligence (1999).

Williams, C. K. I., Barber, D.: Bayesian Classification with Gaussian Processes. IEEE Transactions on Pattern Analysis and Machine Intelligence (1998).

International Search Report mailed Oct. 27, 2008 for PCT Application Serial No. PCT/US2008/067779, 9 pages.

Platt, J.C. "Probabilistic Outputs for Support Vector Machines and Comparisons to Regularized Likelihood Models." Advances in Large Margin Classifiers, 2000, pp. 61 to 74, The MIT Press, Cambridge, Mass.

Berkovsky, Shlomo. "Ubiquitous User Modeling in Recommender Systems." 10th International Conference, User Modeling, 2005. Springer Bedin/Heidelberg, 2005, vol. 3538/2005, pp. 496-498.

Pending, unpublished U.S. Appl. No. 12/389,187, filed Feb. 19, 2009.

* cited by examiner

SELECTIVE SAMPLING OF USER STATE BASED ON EXPECTED UTILITY

BACKGROUND

Today more than ever, information plays an increasingly important role in the lives of people and companies. The Internet has transformed how goods and services are bought and sold between consumers, between businesses and consumers, and between businesses. In a macro sense, highly competitive business environments cannot afford to squander any resources. Better examination of the data stored on systems, and the value of the information can be crucial to better align company strategies with greater business goals. In a micro sense, decisions by machine processes can impact the way a system reacts and/or a human interacts to handling data.

A basic premise is that information affects performance. Accordingly, information has value because an entity (whether human or non-human) can typically take different actions depending on what is learned, thereby obtaining higher benefits or incurring lower costs as a result of knowing the information. In the context of a cost analysis, the value of information (VOI) can be calculated based on the value or cost obtained if action must be taken without information versus the value or cost obtained if information is first learned, and then action is taken. The difference between these two values or costs can then be called the economic VOI.

VOI can provide enormous benefits in many different areas. For example, VOI analysis has been applied to earth science data, horse racing, the stock market, and alert systems. In another example, accurate, timely, and relevant information saves transportation agencies both time and money through increased efficiency, improved productivity, and rapid deployment of innovations. In the realm of large government agencies, access to research results allows one agency to benefit from the experiences of other agencies and to avoid costly duplication of effort.

In more focused areas, where human interaction is an important factor, which is typically a factor in most, if not all, aspects of a business, businesses are continually seeking ways in which to maximize employee productivity. Interest has been growing in opportunities to build and deploy statistical models that can infer a computer user's current interruptability from computer activity and relevant contextual information. One system intermittently asks users to assess their perceived interruptability during a training phase and builds decision-theoretic models with the ability to predict the cost of interrupting the user. The system employs models at run-time to compute the expected cost of interruptions, and provides a mediator for incoming notifications, based on consideration of a user's current and recent history of computer activity, meeting status, location, time of day, and whether a conversation is detected, for example.

However, a human decision maker (e.g., the user) usually derives subjective probabilities about the quality of the information and will make use of additional information to "update" his or her prior beliefs. Where the decision maker is not human, but an algorithm, other factors can come into play. For example, algorithms that alert on constraint violations and threats in a straightforward manner can inundate a user in dynamic domains. In fields such as medical monitoring, unwanted alerts can be a problem in that alerts provided each second will quickly be processed differently (e.g., discarded) by the user in stressful situations, for example. Accordingly, to be useful, the algorithm needs to produce high-value, user-appropriate information.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation facilitates model enhancement by providing selective sampling of data to enhance model performance where model testing is deemed to be poor. Sampling can include direct interaction with the user while the user is logged-in to the computing system. The system can be used to infer a computer user's current interruptability based on computer activity and relevant contextual information. Personalized models can then be created that are utilized to determine a cost of interruption and an expected utility.

In accordance with some embodiments, lifelong learning can be employed wherein the training is ongoing over extended periods and the best predictive models are used to guide supervision. A cost of interrupting a user with incoming alerts can be considered as well as a measure of cost that includes both the cost of probes for additional cases and the cost associated with real-world usage as an alert mediation system. In some embodiments, selective supervision can be employed wherein manual efforts for labeling data are guided to obtain an optimal boost in discriminatory power with increasing amounts of effort.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
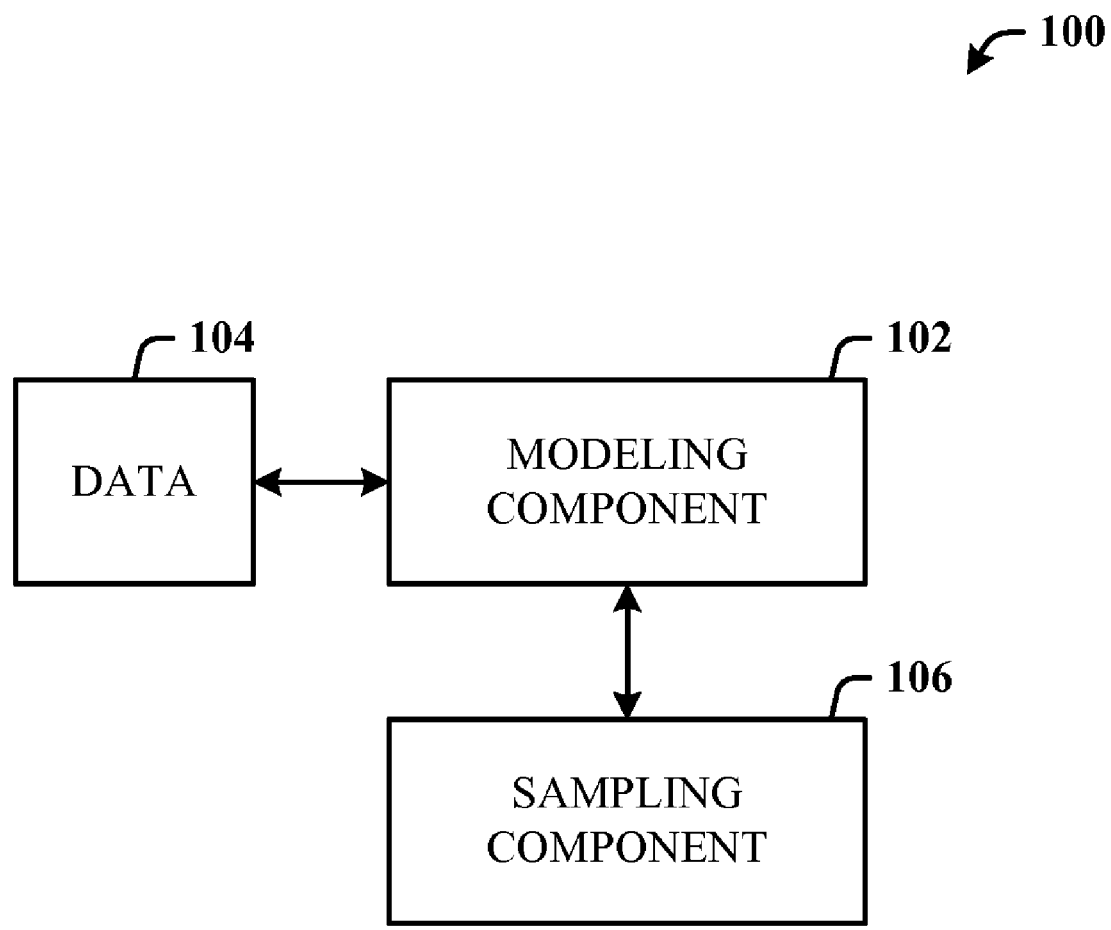
FIG. 1 illustrates a system that facilitates model enhancement in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component", "system", "module" and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates model enhancement in accordance with an innovative aspect. The system 100 can be used to infer a computer user's current interruptability based on computer activity and relevant contextual information. The system 100 can create personalized models that can be utilized to determine a cost of interruption. In some embodiments, system 100 can employ principles of lifelong learning and/or selective supervision, which will be described in more detail below.

The system 100 can include a modeling component 102 that can be configured to build and run models based on data 104, which can be any type of data such as application data, user profile data, tracking data, user state data, user situation data, and so on. The system 100 can also include a sampling component 106 that can be configured to sample the data 104 based on failure analysis of the model. For example, where the model performs above a predetermined criteria over certain data, no further action is necessary. However, where the model performs poorly over a certain set of data, other actions can be invoked. In other words, the areas of poor performance can drive the focus of the engine. The system 100 is a utility-centric approach to gathering data to maximally enhance the current model.

In operation, data is sampled and stored from different data sources. The model can be built based on one or more of the datasets from the different sources or over the total combined set of data of all the datasets, for example. The model can be run on the dataset(s) and analyzed as to where the model is performing poorly. Where the system utilizes user interaction as a means of gathering a particular dataset, the system can be selective about what questions are posed to the user in order to obtain the desired information to enhance the poorly-performing data. The system 100 can additionally or alternatively choose data from a stream of data associated with user-system interaction that is being logged in the background.

The data can be sampled from a variety of different sources. Such sources include but are not limited to: computer input devices such as mouse data, keyboard data (e.g., keystrokes data and keystroke speed), video cam data (e.g., user pose), user voice characteristics related to microphone input data (e.g., speech volume, intonations, inflections, content . . . ), user biometric data (e.g., heart rate, retinal data, temperature . . . ), and other contextual data such as physical environment (e.g., humidity, temperature . . . ).

In some embodiments, system 100 can employ lifelong learning and/or selective sampling. Lifelong learning can provide training is ongoing over a prolong period and decision can be made continuously about the value of probing users for the value of unobserved states associated with different situations. Selective sampling can utilize a Gaussian Process classification. Further information relating to lifelong learning and selective sampling is provided below.

Figure 2:
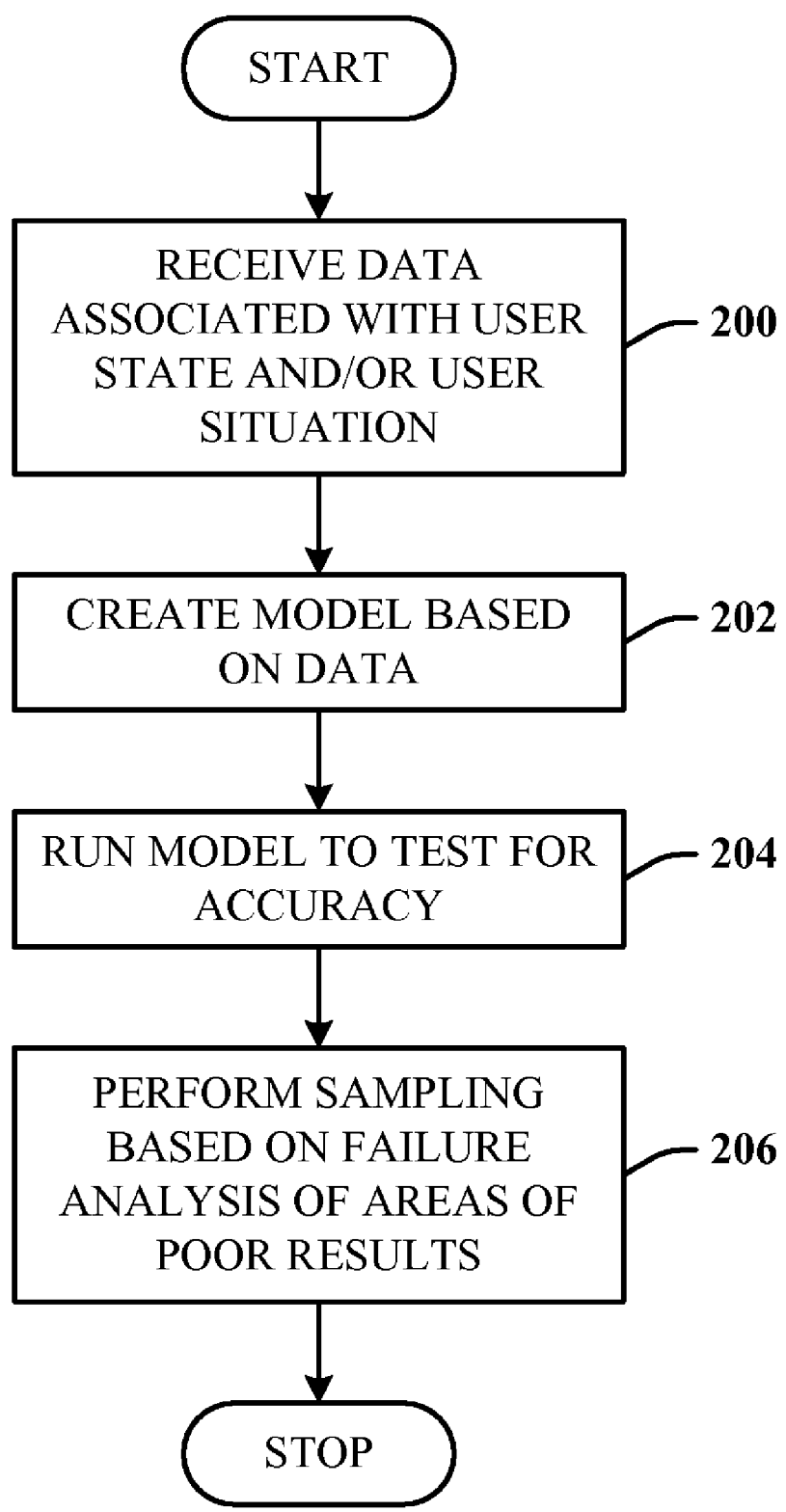
FIG. 2 illustrates a methodology of enhancing model performance in accordance with an aspect.

FIG. 2 illustrates a methodology of enhancing model performance in accordance with an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, data is received, the data can be associated with user state and/or user situation. At 202, a model is created based on some or all of the data. At 204, a model is ran or invoked to test for performance (e.g., accuracy, failure in accuracy and so forth. At 206, sampling (e.g., selective sampling) is performed based on model failure analysis (e.g., poor performance over certain data).

Figure 3:
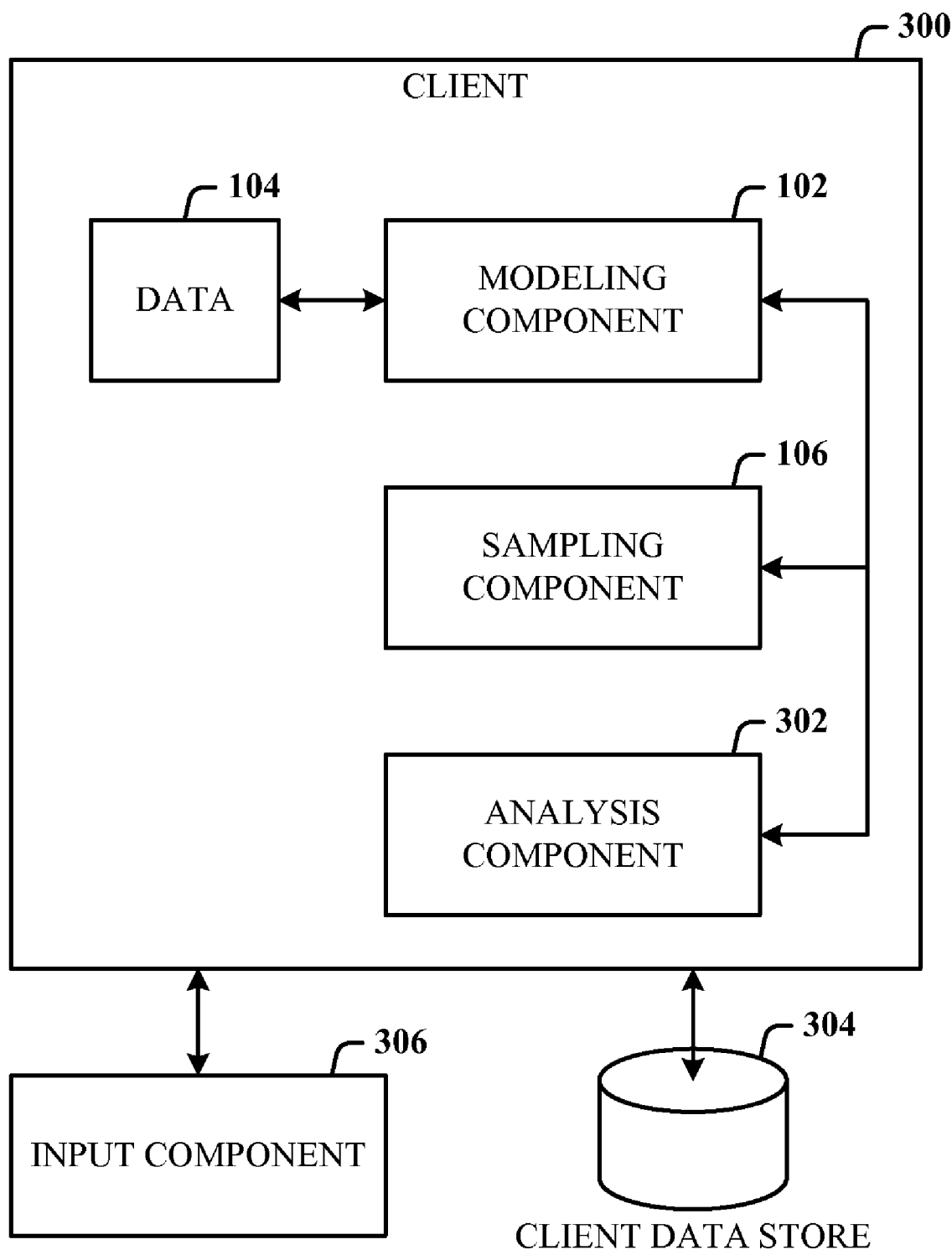
FIG. 3 illustrates a client-based system that employs an analysis component to facilitate model enhancement in accordance with an innovative aspect.

Referring now to FIG. 3, there is illustrated a client-based system 300 that employs an analysis component 302 to facilitate model enhancement in accordance with an innovative aspect. The system 300 includes the modeling and sampling components (102 and 106) of FIG. 1 for model generation/execution and sampling as described above. The analysis component 302 facilitates analysis of how well or how poorly the model runs based on the current sets of data. The system 300 interfaces to an external data store 304 that can store data related to many different aspects of a system on which the client is running. The data store 304 can be a mass storage device (e.g., a hard disk drive, optical storage device . . . ) and/or include faster memory architectures such as flash memory, chip memory, and the like. The data 104 can include subsets of the data stored on the data store 304, which has been retrieved therefrom for model generation and execution.

The client-based system 300 can also interface to an input component 306 to receive input data from a number of different input sources desired for any given application. For example, in a desktop computing environment, the input component 306 can encompass user interaction with applications that are currently running, will be launched, and that will be closed. This further can include how the user interacts when within a particular application through windows, menus, what applications are being launched, and so on. Accordingly, the client 300 can be configured to log each keystroke and other input device signals (e.g., mouse), application opening and closing, temporal information (e.g., time of day, day, date . . . ), location of the computing device (e.g., IP address), default user settings for any application in which interaction occurs, and so on. This information can be stored on the data store 304 for later access and processing (e.g., model building). Thus, a rich stream of information (e.g., desktop events) can be selected and stored for model building and processing to determine the cost of interruptability.

In another example, where the computing device is a portable computer, the input component 306 can also receive, process, and input wireless data to the data store 304. For example, signal strength data can be received and stored, and as previously indicated, the number and type of applications being opened on the computer and user interaction data, for example. There is no limitation as to the type and amount of data that can be received by the input component 306 for model building and testing. For example, image content that captures the demeanor of the user through facial expressions during user interaction with the device or system can be useful in determining the value of information for interruptability.

In another example, where the client is installed on a cellular telephone information received and input through the input component 306 can include signal strength data, user interaction through the phone keypad, messaging and message text transmitted and received through the phone, user settings, time of use, amount of use, calls typically received and by whom, and so on. The information can be processed for model building, and can be analyzed by the analysis component 302 to determine in what areas of data the model may be performing poorly.

These events, along with information drawn from the user's applications (e.g., a calendar program), wireless signals, and input devices can be combined with self-assessments to build a library of cases. The model or models (e.g., Bayesian network models) can be trained and periodically re-trained, for example, to provide real-time inferences about the cost of notification. The models can be linked to programming interfaces that allow other components, such as notification systems to assess an expected cost of interruption. The system can be instructed to execute either entirely on a user's personal computer or other devices, or to alternatively package the information locally and to communicate its logs to a server when network connections become available. The use of a central server can enable the construction of models that consider activity on multiple machines that the user may use at the same or different locations.

Figure 4:
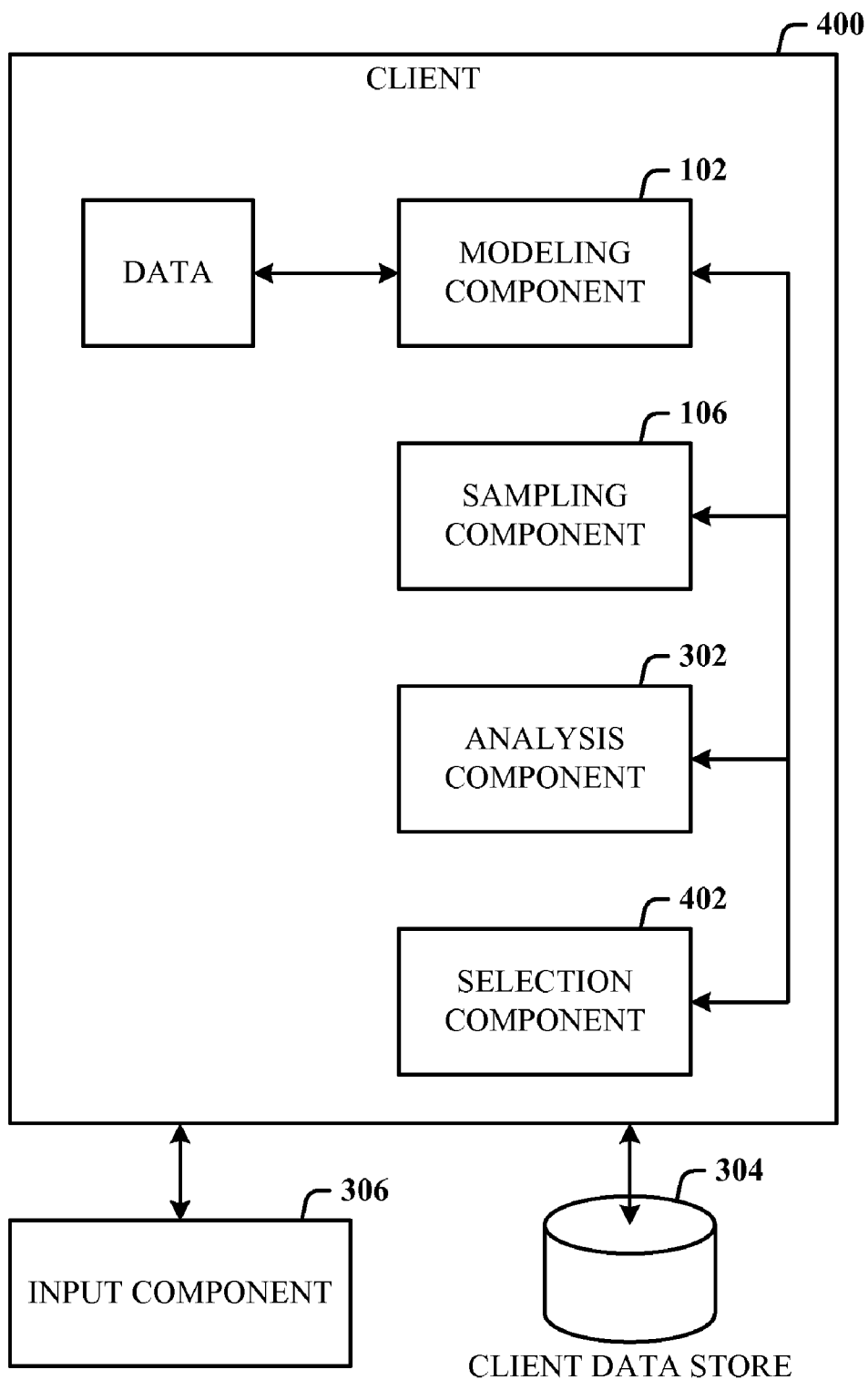
FIG. 4 illustrates a client that facilitates selective sampling in accordance with another aspect of the innovation.

FIG. 4 illustrates a client 400 that facilitates selective sampling in accordance with another aspect of the innovation. The client 400 includes the modeling component 102 for model generation and execution, the sampling component 106 for sampling data of the data store 304 and/or direct sampling by the system user, and the analysis component 302 that analyzes the model performance based on the selected data, as described earlier. Here, the system 400 further includes a selection component 402 that facilitates the selection of existing stored data and/or the collection of additional data through the input component 306 desired for improving on model execution over an existing set of data. In other words, the selection component 402 can be controlled to select data from data sources that will enhance performance of the model in areas in which it is performing poorly.

Figure 5:
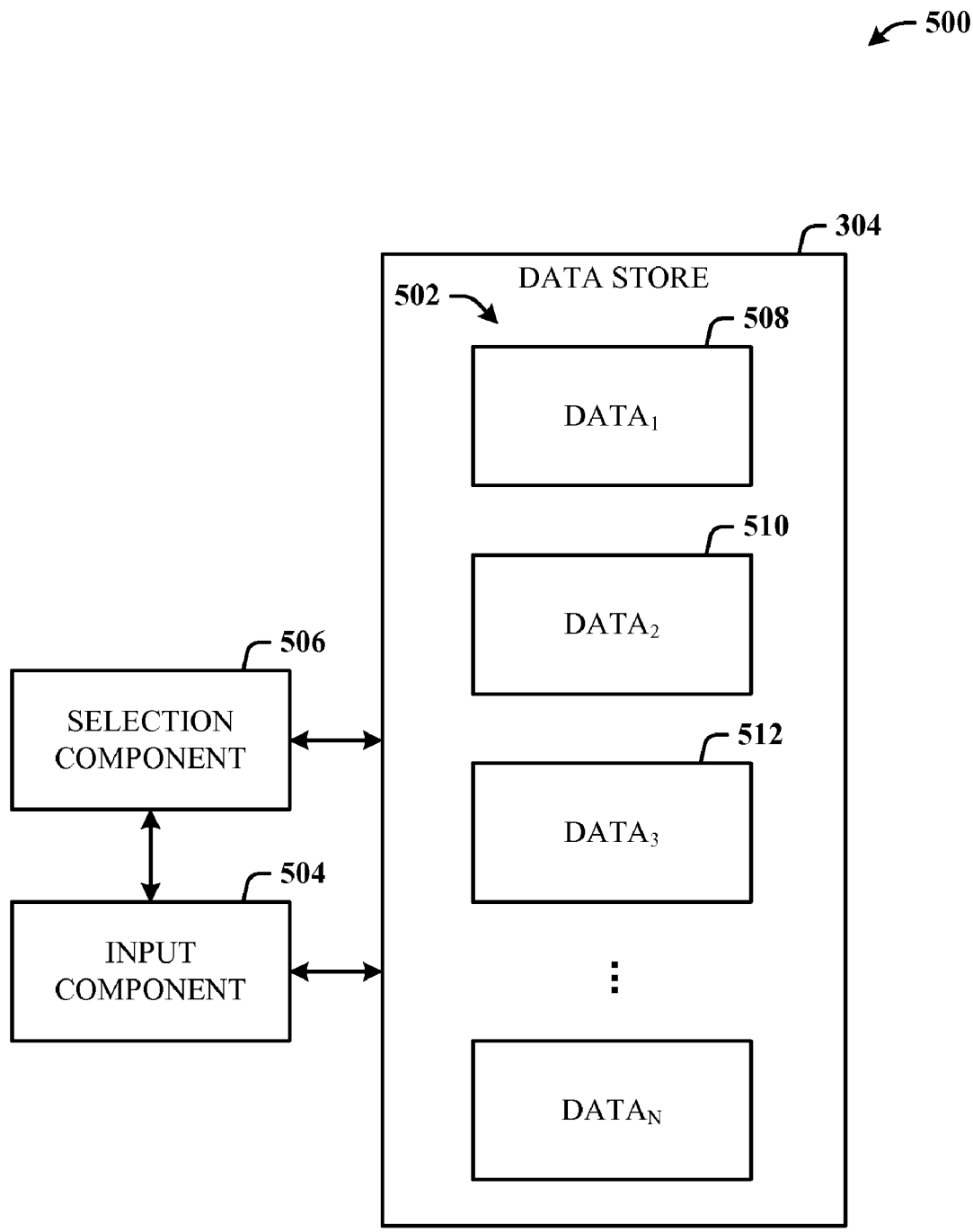
FIG. 5 illustrates a system that facilitates selective sampling of data to enhance model performance for determining a cost of interruptability in accordance with another aspect of the innovation.

FIG. 5 illustrates a system 500 that facilitates selective sampling of data to enhance model performance for determining a cost of interruptability in accordance with another aspect of the innovation. The system 500 includes the data store 304 that can store various types and kinds of data 502 (denoted $DATA_1, DATA_2, DATA_3, \ldots, DATA_N$, where N is an integer). The data 502 can include data that is retrieved or logged by an input component 504 such as input device data, keypad data, application interaction data, and system data, for example. The input component 504 can interface directly to the data store 304 to store the received input data directly into storage locations. Alternatively, or in combination with the direct interface to the data store 304, the input component 504 can interface with the data store 304 through a selection component 506. The section component 506 can facilitate the selection of sets or subsets of the data 502 already stored in the data store 304, and/or data from the input component 504 that can be received from direct prompting of the user (e.g., a pop-up window presented to the user that requests one or more selections to be made).

For example, a first dataset 508 of the data 502 can be logged information related to whether the user is typing or moving and clicking with a mouse. A second dataset 510 of the data 502 can be logged historical information such as user interaction with past applications and window titles, for example. A third dataset 512 can be logged information related to timing and pattern of switching between applications and window titles, for example. Other information (up to $DATA_N$) can be logged and stored, the amount of which can be determined by the particular implementation.

The selection component 506 can allow for model training data to be selected from a single source (e.g., dataset 508 or dataset 510) or from multiple sources (e.g., dataset 508 and dataset 510). For example, if failure analysis indicates that the model performs poorly based on data from the first dataset 508, related data can be retrieved form the second dataset 510 and/or the third dataset 512, for example.

Selection by the selection component 506 is not limited to the stored data 502. Alternatively or additionally, data can be obtained directly from interaction with the user through the input component 504. Still alternatively or additionally, data can be obtained directly from the user and from the stored data 502.

Figure 6:
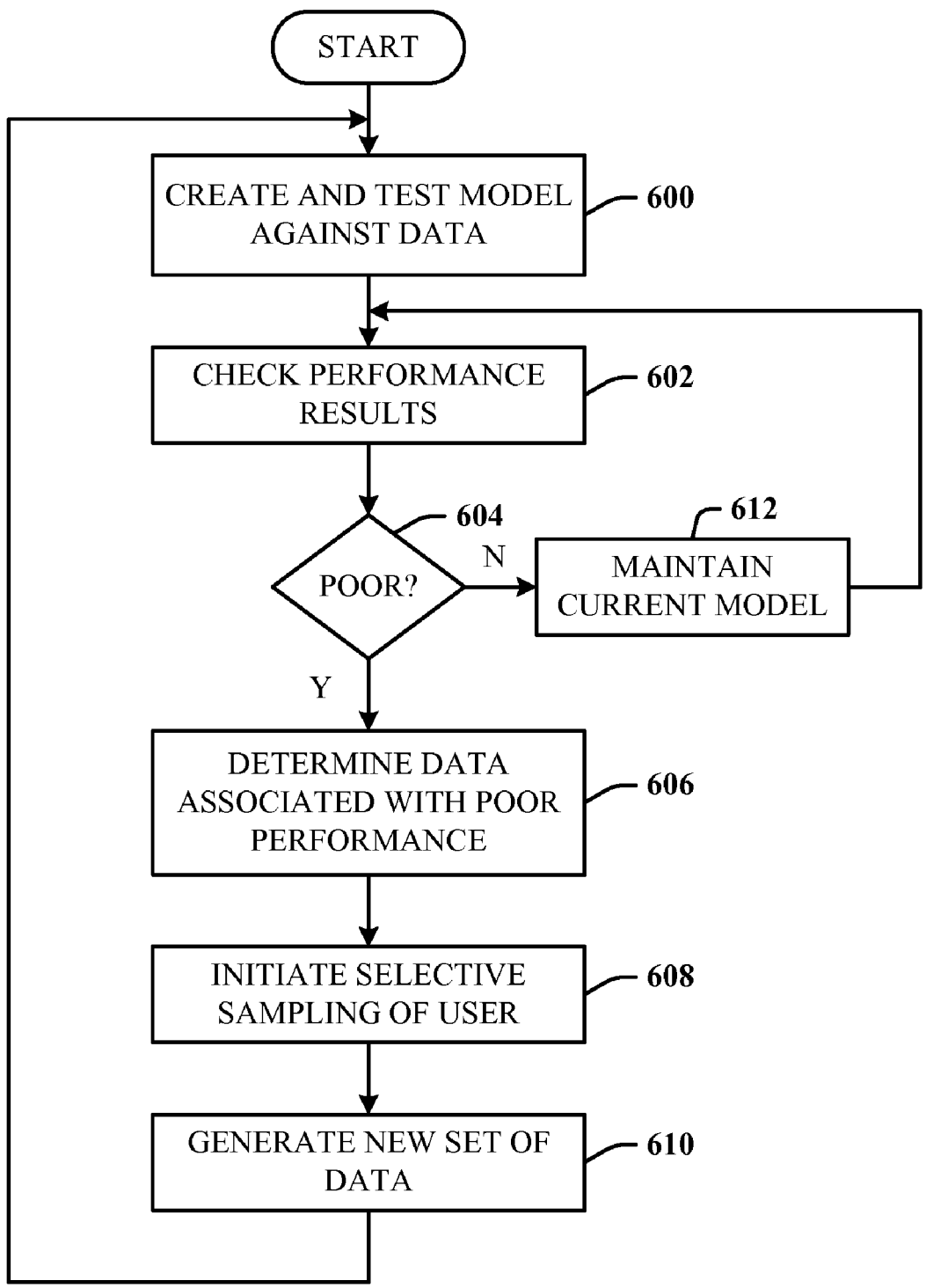
FIG. 6 illustrates a methodology of initiating selective sampling based on model poor performance in accordance with the disclosed innovation.

Referring now to FIG. 6, there is illustrated a methodology of initiating selective sampling based on model poor performance in accordance with the disclosed innovation. At 600, a model is created and tested based on a first set of data. At 602, performance results of the model are checked against another set of data. At 604, if the performance results are poor, flow is to 606 to determine the data associated with the poor performance. At 608, selective sampling is initiated. At 610, a new set of data can be created based on the selective sampling. This new set of data can be the original set of data plus additional new data or a totally new set of data that is created during the selective sampling process. Progress can proceed to 600 to test the model performance against this new set of data. If the model results are not poor, as determined by some predetermined criteria, flow is from 604 to 612 to maintain the current model. The system can continue to check model performance as indicated by flow looping back to 602.

Figure 7:
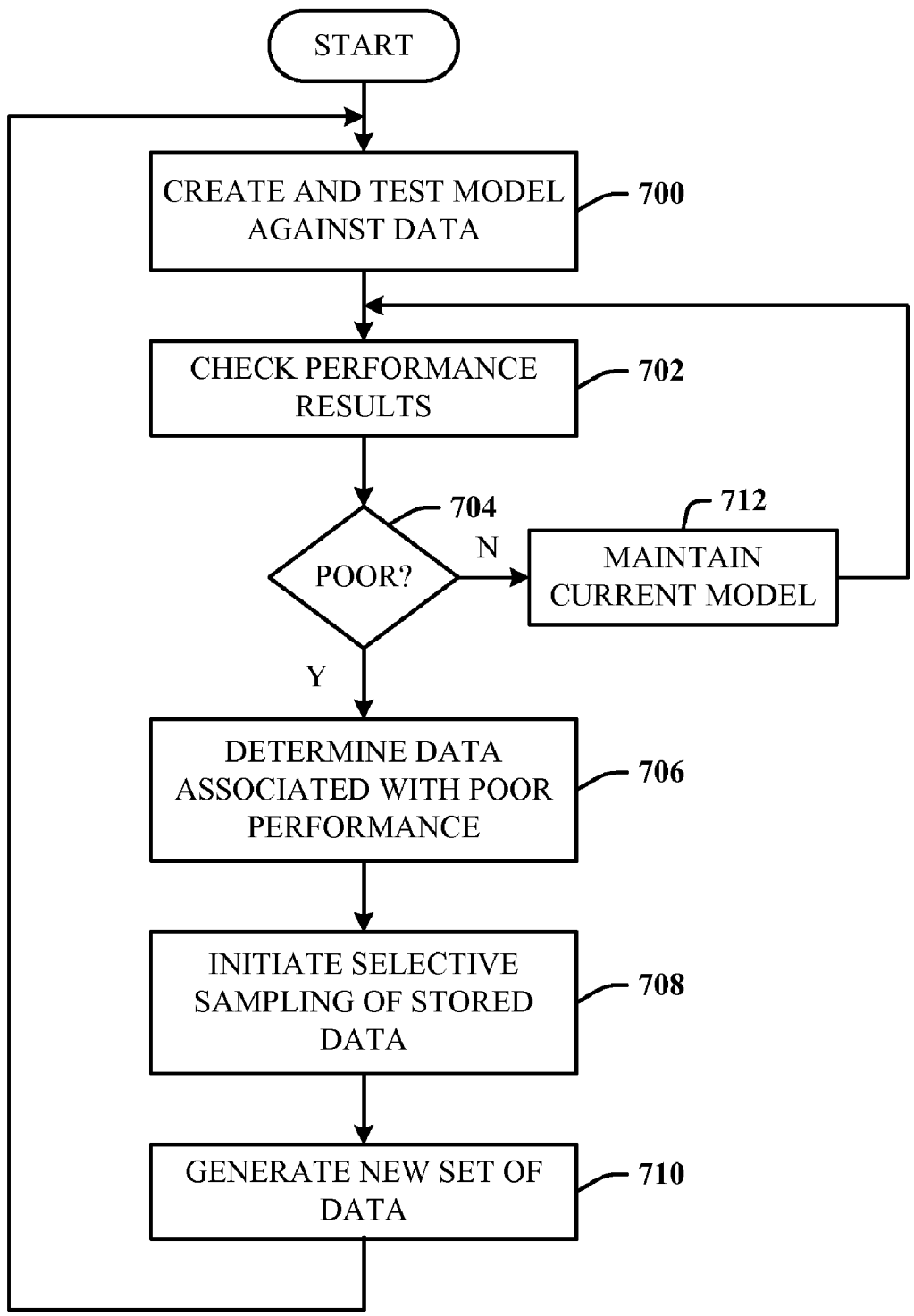
FIG. 7 illustrates a methodology of performing selective sampling of stored data based on poor data in accordance with the disclosed innovation.

Referring now to FIG. 7, there is illustrated a methodology of performing selective sampling of stored data based on poor data in accordance with the disclosed innovation. At 700, a model is created and tested based on a first set of data. At 702, performance results of the model are checked against another set of data. At 704, if the performance results are poor, flow is to 706 to determine the data associated with the poor performance. At 708, selective sampling is initiated on the stored data. At 710, a new set of data can be created based on the selective sampling of stored data. This new set of data can be the original set of data plus additional new data or a totally new set of data that is created during the selective sampling process. Progress can proceed to 700 to test the model performance against this new set of data. If the model results are not poor, as determined by some predetermined criteria, flow is from 704 to 712 to maintain the current model. The system can continue to check model performance as indicated by flow looping back to 702. It is to be appreciated that flow need not loop back to continue checking model performance, but can terminate at this time, and re-initiate at a later time.

Figure 8:
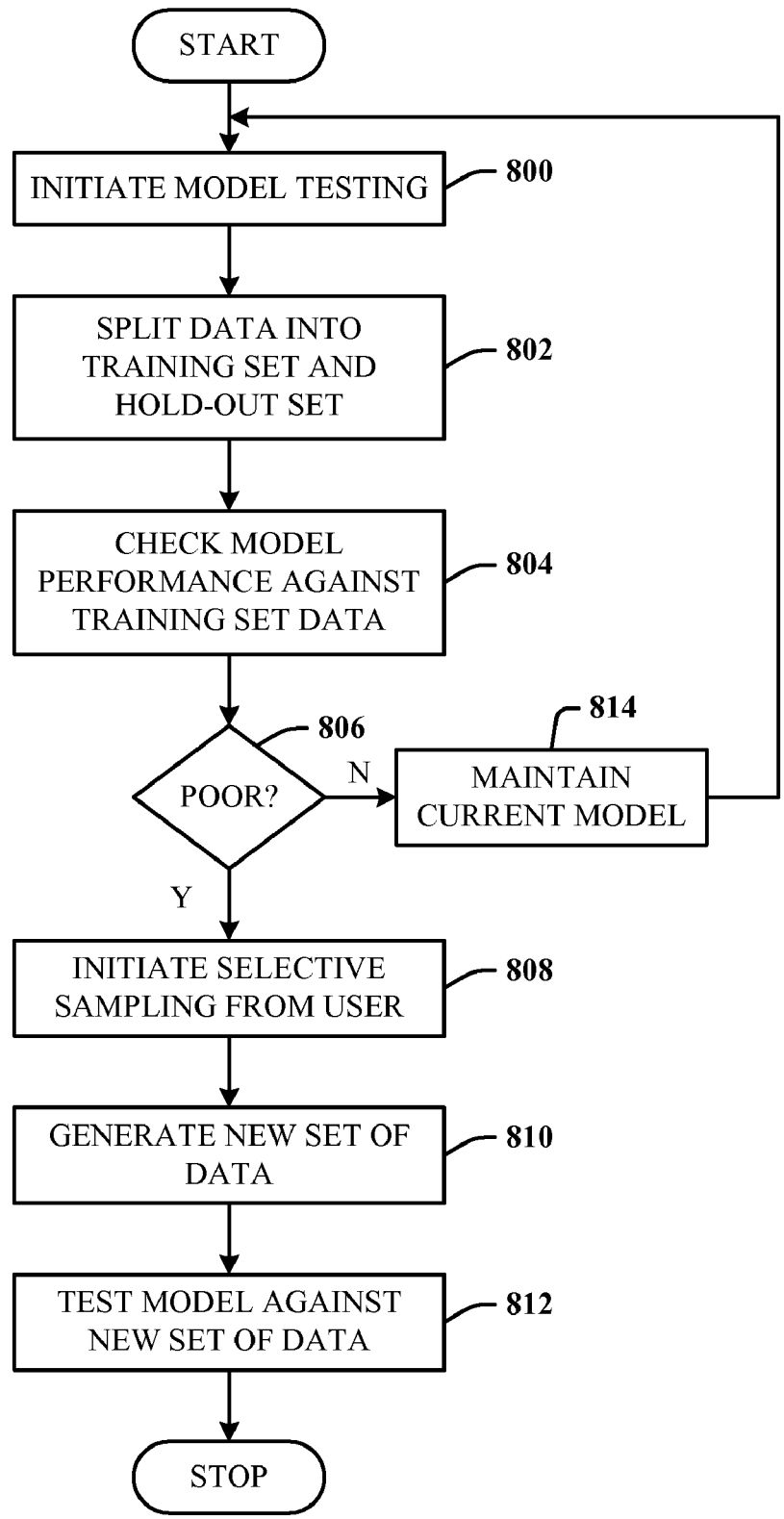
FIG. 8 illustrates a methodology of determining when to initiate selective sampling against a user in accordance with the disclosed innovation.

Referring now to FIG. 8, there is illustrated a methodology of determining when to initiate selective sampling against a user in accordance with the disclosed innovation. At 800, model testing is initiated. At 802, data is split into a training set and a hold-out set. In one implementation, the training set is about 80% of the data and the hold-out set is about 20%. Other split percentages are within contemplation of the subject innovation. At 804, model performance is then checked against the training dataset. At 806, it can be determined whether performance results are poor. This can be based upon predetermined criteria. If the results are deemed poor for the particular dataset, flow is from 806 to 808 to initiate selective sampling from the user. The sampling associated with user interaction can be based only on areas of data over which the model performed poorly. Accordingly, questions suited to enhancing model performance for that set of data can be determined and invoked. At 810, results of the sampling generate a new set of data. At 812, the existing model is tested against the new dataset. This process can continue until the model performance meets or exceeds the desired performance criteria, as could be exhibited by flow looping back to 802 (although not shown this way). If the model results are not poor, as determined by some predetermined criteria, flow is from 806 to 814 to maintain the current model. The system can continue to check model performance as indicated by flow looping back to 800.

Figure 9:
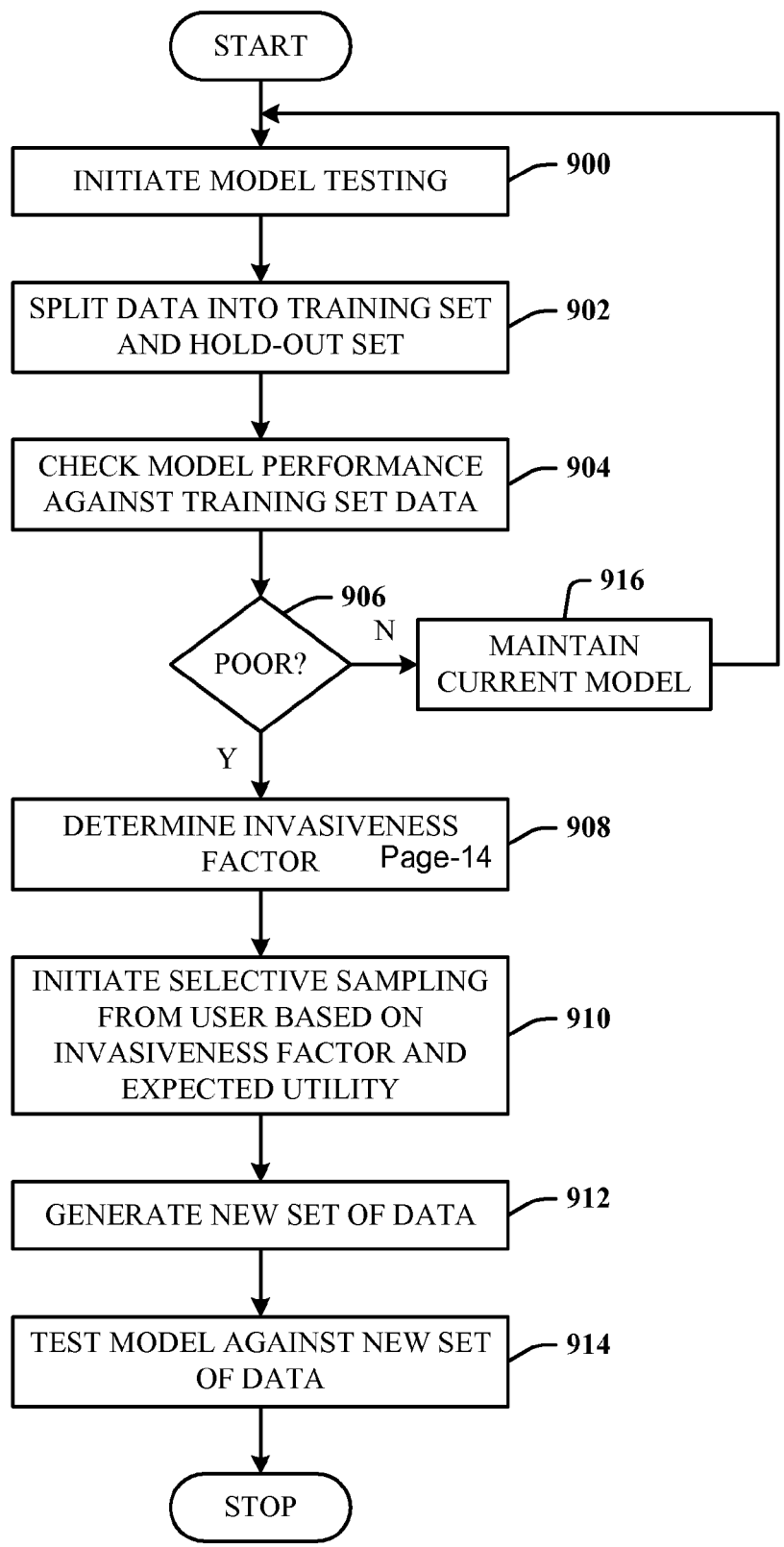
FIG. 9 illustrates a methodology of determining when to initiate selective sampling against a user based on invasiveness and expected utility in accordance with the disclosed innovation.

Referring now to FIG. 9, there is illustrated a methodology of determining when to initiate selective sampling against a user based on invasiveness and expected utility in accordance with the disclosed innovation. At 900, model testing is initiated. At 902, data is split into a training set and a hold-out set. In one implementation, the training set is about 80% of the data and the hold-out set is about 20%. Other split percentages are within contemplation of the subject innovation. At 904, model performance is checked against the training dataset. At 906, it is determined if model performance results are poor. This can be based upon predetermined criteria. If the results are deemed poor for the particular dataset, flow is from 906 to 908 to determine an invasiveness factor. Invasiveness can be determined from historical information previously logged. For example, previously logged data can indicate that the user rarely, if ever, is interrupted at a point in time (e.g., early in the morning), during interaction with a particular application or applications (e.g., a programming language application that relies on focused attention), based on lack of voice data, and so on.

At 910, the system initiates selective sampling from the user based upon the invasiveness factor and an expected utility. At 912, a new set of data is generated from the sampling process. At 914, the model is tested against the new dataset. Again, if at 906, the model results are determined not to be poor, as determined by some predetermined criteria, flow is from is to 916 to maintain the current model. The system can continue to check model performance, as indicated by flow looping back to 900.

As before, the sampling associated with user interaction can be based on areas of data over which the model performed poorly. Accordingly, questions suited to enhancing model performance for that set of data can be determined and invoked.

The expected utility can be a measure of the value of the information reasonably expected to be gained by invasively engaging the user at a point in time. In other words, where an agent can be provided that mediates communications and messaging, principles of expected utility decisionmaking can be invoked to compute the expected cost of interruption under uncertainty in taking mediation actions.

Figure 10:
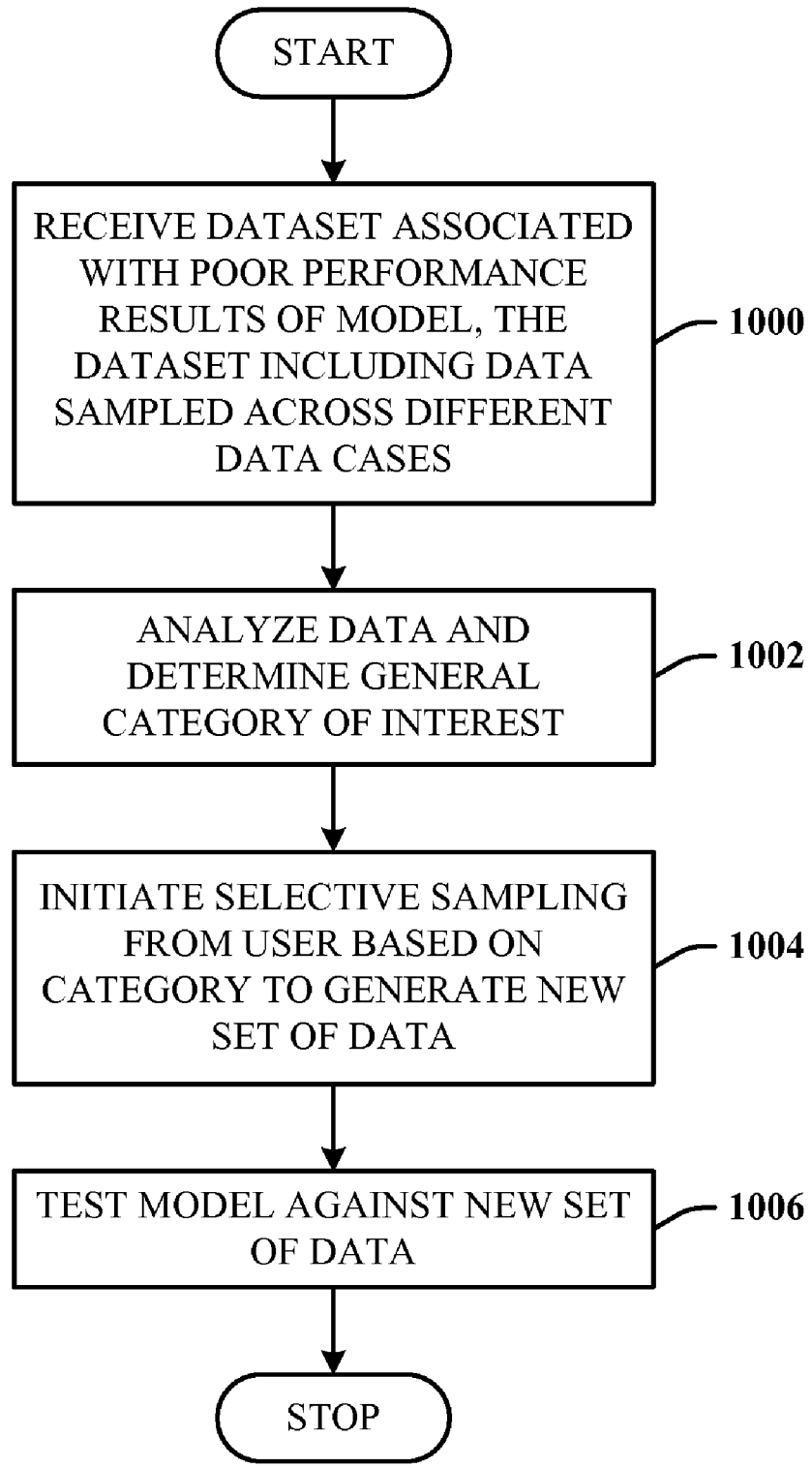
FIG. 10 illustrates a methodology of determining a general category of data in preparation for selective sampling across disparate datasets in accordance with the disclosed innovation.

Referring now to FIG. 10, there is illustrated a methodology of determining a general category of data in preparation for selective sampling across disparate datasets in accordance with the disclosed innovation. At 1000, a dataset is received that is associated with poor model performance.

The dataset can include data sampled from disparate datasets, although related in a general way. For example, assume that the dataset includes all data logged during a time span ranging from 8 AM to 9 AM. This can be inferred, based on a certain category of individual (e.g., a programmer), to be a time at which the cost of interruptability would be high. The cost can be computed based on a wide variety of factors or criteria. For example, for this individual, it has been determined from historical data that he or she typically begins interacting with their office computer during these morning times. Additionally, from accessing logged data associated with the individual's e-mail program, it is known that the individual normally does not process (e.g., read or send) e-mail at this time. Still further, it is known from logged data that the people with whom the individual normally interacts through e-mail or telephone, for example, do not arrive at their work locations until after 9 AM.

Accordingly, the library of datasets can include a first dataset associated with e-mail interaction, a second dataset associated with input device activity, a third dataset associated with other user activity with which the individual normally communicates, and so on. Thus, during this span of time between 8 AM and 9 AM, the dataset used to train and test the model can be the data sampled during this time from at least these three different datasets (or cases).

At 1002, the data is analyzed to determine a general category of interest. For example, this can be a more focused category of with which applications is the individual interacting. At 1004, the system can initiate selective sampling directly to the individual. Alternatively, the system could not only go back and include some of the already-selected data, but sample other data from other data cases, thereby generating a new dataset over which the model performance can be tested. These and other data can be compiled to further determine the cost of interruptability of this individual at this time. At 1006, the model is tested on the new dataset, and performance results noted.

Figure 11:
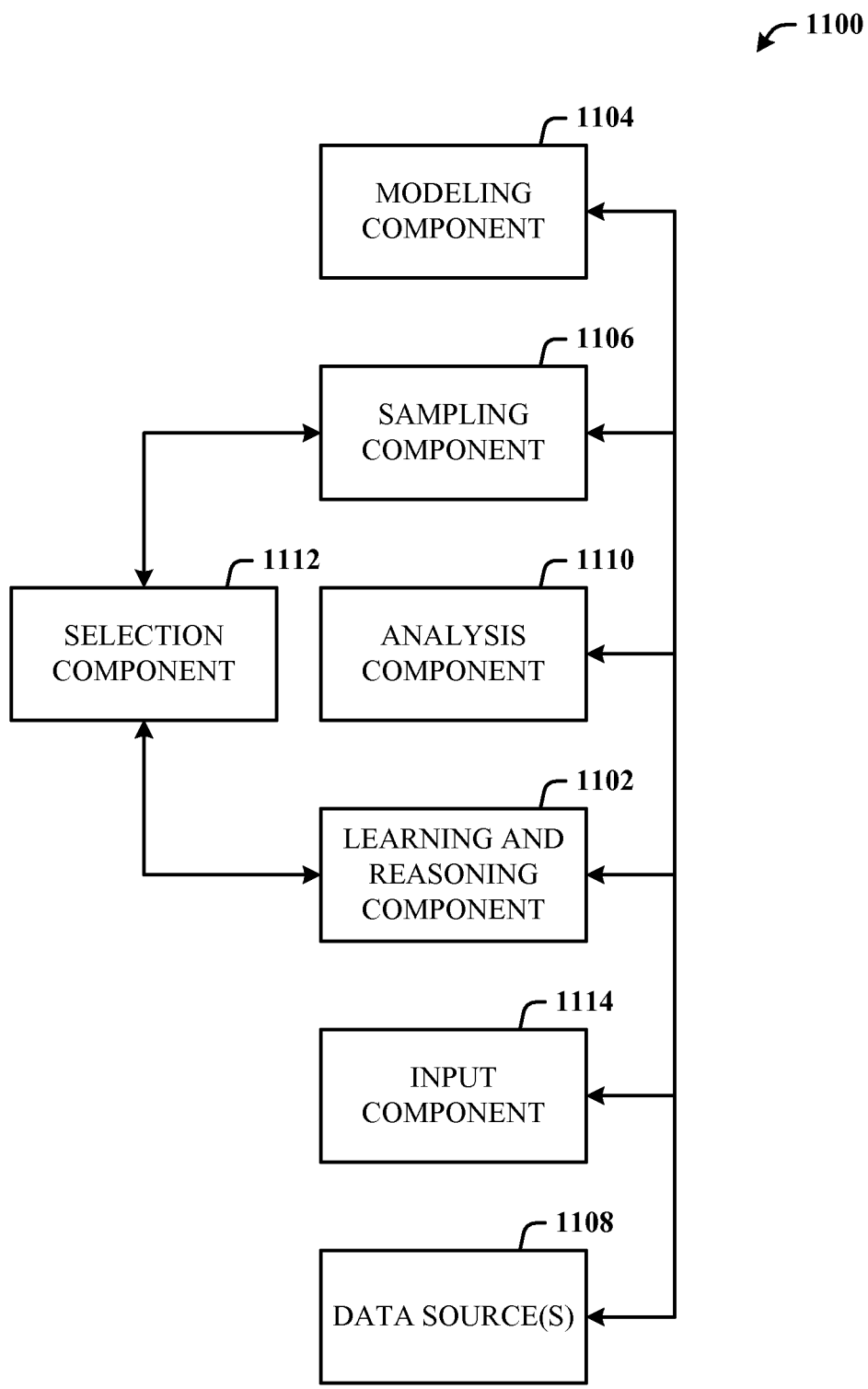
FIG. 11 illustrates a system that employs a machine learning and reasoning component that facilitates automating one or more features in accordance with the subject innovation.

FIG. 11 illustrates a system 1100 that employs a machine learning and reasoning (LR) component 1102 that facilitates automating one or more features in accordance with the subject innovation. The system 1100 facilitates selective sampling and includes a modeling component 1104 for model generation and execution, the sampling component 1106 for sampling data of a data store 1108 and/or direct sampling by the system user, and an analysis component 1110 that analyzes the model performance based on the selected data, as described earlier. Here, the system 1100 further includes a selection component 1112 that facilitates the selection of existing stored data and/or the collection of additional data through an input component 1114 desired for improving on model execution over a set of data. In other words, the selection component 1112 can be controlled to select data from data sources (e.g., disparate, direct user interaction) that will enhance performance of the model in areas in which it is performing poorly. Here, the selection component 1112 is disposed between the LR component 1102 and the sampling component 1106 such that the LR component 1102 controls sampling across one or more data sources (e.g., disparate, direct user interaction).

The subject embodiments (e.g., in connection with selection) can employ various LR-based schemes for carrying out various aspects thereof. For example, a process for determining how to function based on invasiveness can be facilitated through an automatic classifier system and process. A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be employed to automatically learn and perform a number of functions according to predetermined criteria.

For example, when the invasiveness factor is determined to be high, the system can learn that the cost of interruptability will be high. Accordingly, the LR component 1102 can be employed to decide that interrupting the user should be postponed to a later time, when the cost may not be so high. Alternatively, the system can determine that if user interruption is to proceed, that the number of prompts and/or timing between when the prompts are presented, are restricted or minimized.

In another example, the LR component 1102 can be employed to reason and infer about which stored data cases can be sampled, and whether to employ selective sampling directly from the user. This reasoning and inference process can be based on user profile information, time (e.g., hour, day, week . . . ) or time span, desktop activities, recent history of user activity related to applications and application windows, file types and/or file names with which the user interacts, and so on.

Figure 12:
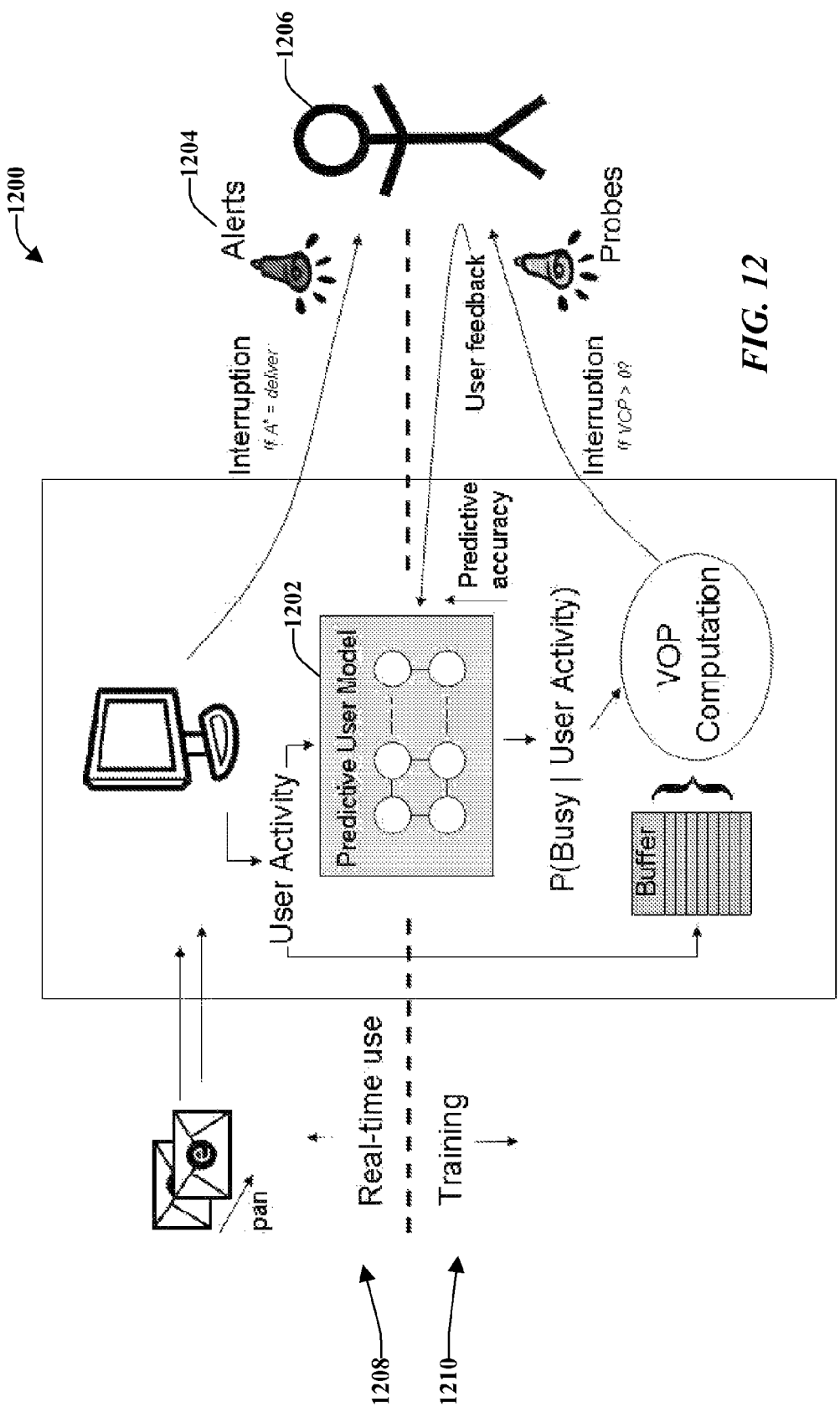
FIG. 12 illustrates a lifelong learning framework for training a system alert mediation system that can be employed with the disclosed embodiments.

FIG. 12 illustrates a lifelong learning framework for training a system alert mediation system 1200 that can be employed with the disclosed embodiments. Predictive user models often utilize a phase of effortful supervised training where cases are tagged with labels that represent the status of unobservable variables. Lifelong learning can provide ongoing training over a prolonged period. In lifelong learning, decisions can be made continuously about the value of probing users for the values of unobserved states associated with different situations. The learning can continually weigh the cost of interrupting the user with probes (or prompts) for unobservable states with the long-term benefits of acquiring a new label.

System 1200 can apply a decision-theoretic approach to guide experience sampling, centering on taking a value-of-information perspective. Thus, user-modeling systems can be built that have the ability to perform lifelong learning by continuing to leverage current knowledge to make decisions about if and when to probe users for feedback. This can be performed in an efficient manner and allows ongoing updates of a user model given potential changes in users, tasks, and challenges.

FIG. 12 illustrates a lifelong learning framework in a schematic manner. At the core of the framework is a predictive user model 1202 that can be configured to determine how to handle incoming alerts 1204. The predictive user model 1202 can be configured to adapt and to learn continuously from the user 1206, which can be performed by sending requests to the user 1206 (e.g., prompts, probes, and so forth). System can be divided into two inter-related phases of analysis: a real-time usage phase 1208 and a training phase 1210. These phases 1208, 1210 can run at substantially the same time while relying on each other.

System 1200 can encounter many alerts 1204 and the real-time usage phase 1208 attempts to take appropriate actions when alerts 1204 arrive. Relaying an alert 1204 to the user 1206 is provided at the cost of interruption, which is a function of the user state. Upon receiving an alert 1204 the system 1200 (e.g., through its real-time usage phase 1208) can either relay the alert 1204 at substantially the same time it is received, defer its delivery, or handle the alert 1204 in some other way. Each of the different actions can be associated with a utility. Thus, real-time usage phase 1208 can attempt to maximize the expected value (or minimize the expected cost) of the handling of messages.

Thus, U(a, A) can be used to refer to the utility gained by taking an action A on an alert of type a. I(s, A) can be used to refer to the cost of interruption that occurs when the system 1200 takes the action A when the user is in a state of interruptability s. Upon receiving an alert 1204, the optimal action, A*, is the action associated with maximum expected utility. Assuming decomposability of costs and benefits, the ideal action can be computed as:

$$A^* = \underset{A}{\operatorname{argmax}}\ U(a, A) - \int_s I(s, A)p(s \mid E) \quad \text{Equation 1}$$

The user state s cannot be directly observed, however system 1200 can have access to the evidence E about a user's context and activity from an event system. The user model constructed with data already available can be utilized to predict the probability distribution p(s|E) over the sets of states of interruptability. The dependability of the computation of the best action for the system 1200 during usage can depend upon the accuracy of the user model.

The user model, which can compute the probability over user states, p(s|E), can be constructed with one of several statistical machine-learning procedures. These procedures can associate patterns of evidence with the states of the user. Examples of machine-learning procedures include Bayesian networks, binary classification systems, support vector machines (SVMs), and decision trees. As the posterior probability, p(s|E), plays a role in the lifelong learning process, a probabilistic methodology, such as Bayesian networks or Gaussian Process (GP) classification can be employed.

A goal of the training phase 1210 or cycle can be to train and to refine the user model by seeking labeled cases from the user. Increasing the number and representativeness of cases may increase the accuracy of the user model. Unfortunately, requesting feedback from the user can result in an interruption; therefore, there is a cost that can vary depending on the context.

The value of probing (VOP) for a situation is the expected gain in the long-term utility of a system given a probe. The computation of the value of probing at any moment is based on (1) the available labeled training set, (2) the current set of observations, (3) a characterization of the instances facing the system over time, and (4) a specified period of time of system usage being considered, which can range from a specific duration of time to the expected lifetime of the system.

For example, assume the system already has n training cases $\epsilon_L = \{E_1, \ldots, E_n\}$, with labels $S_L = \{s_1, \ldots, S_n\}$. Each $E_i$ denotes evidence capturing desktop activities and context and $s_i$ denotes the state of the user. Most learning methods focus on minimizing such metrics as classification accuracy. However, the comprehensiveness of the disclosed embodiments can build a lifelong learning system that is sensitive to both the predictive accuracy as well as the cost of interrupting the user with probes.

The system can determine whether to seek information from the user about their state given $E_{new}$, summarizing the current user activity. The decision to proceed with a probe can be determined according to a maximization of the expected value of information (VOI). A default situation will first be considered where no triaging system was available to handle incoming messages. In the absence of a mediation system, the user can be alerted by all messages, $(A=A_{deliver})$. The system can be introduced to increase the expected utility of the user. Thus, let $S_{true}$ be the true state of the user. For each alert a the utility gained in the absence of the alert mediation system is:

$$V^0(a,s_{true})=U(a,A_{deliver})-I(s_{true},A_{deliver}) \quad \text{Equation 2}$$

Let A* be the action selection according to the policy described above with reference to Equation 1. Then, for a user state ŝ predicted by the user model, the utility achieved by the system is:

$$V^*(a,\hat{s})=U(a,A^*)-I(\hat{s},A^*) \quad \text{Equation 3}$$

The value that the system provides given an alert a is:

$$V^*(a,\hat{s})-V^0(a,s_{true}) \quad \text{Equation 4}$$

Next, the expected gain in utility for future alerts can be calculated. This quantity can be approximated by using an empirical mean of the utility gained over the labeled $\epsilon_L$ and the unlabeled cases $\epsilon_U$. It should be noted that a user's pattern of activity may not be stationary over time; as time progresses, a user might acquire new behaviors. A system should be configured to adapt to these potential dynamics. Non-stationarity in activities can be addressed by utilizing a moving buffer $\epsilon_u$ that can summarize recent user activity and provide a means for modeling a current underlying distribution of a user's behavior. Given the labeled data points $\epsilon_L$ and the buffer of unlabeled data points $\epsilon_U = \{E_{n+1}, \ldots, E_{n+m}\}$ that represents the recent distribution of data points, the total gain in utility with the use of the system can be computed as:

$$J_{all} = \int_{a_i} \int_s \sum_{i \in \epsilon_L \cup \epsilon_U} (V^*(a_i, \hat{s}) - V^0(a_i, s))p(s \mid E_i)p(a_i) \quad \text{Equation 5}$$

Note that the state of the user s for all $E_i \in \epsilon_U$ might not be known, thus, system should marginalize over s by considering the conditional posterior $p(s|E_i)$. A current predictive user model can be relied upon to provide an appropriate estimate of $p(s|E_i)$.

Further, it should be noted that the further stream of alerts and the particular incoming alerts $a_i$ associated with each situation $E_i$ might not be known with certainty. Thus, the likelihood of the different alerts, $p(a_i)$ should be considered and marginalized over $a_i$. Thus, the system should learn a model for the distribution of alerts. A Beta distribution can be employed to model the probability for the case where there are two kinds of alerts (e.g., a=0 or a=1). It should be noted that this can be easily generalized to more than two values using, for example, a Dirichlet distribution. Specifically, if P(a=1)=q, the system can model the distribution of future alerts as:

$$P(q) = \text{Beta}(\alpha, \beta) = \frac{1}{B(\alpha, \beta)} q^{\alpha-1}(1-q)^{\beta-1} \quad \text{Equation 6}$$

Here, $q \in [0, 1]$, $B(\cdot)$ is the Beta function with $\alpha$ and $\beta$ as parameters. Logically, $\alpha$ and $\beta$ correspond to the number of alerts encountered so far such that a=1 and a=0 respectively. Initially, there is no available information about the proportions of alerts. Thus, $\alpha=0$ and $\beta=0$. It should be noted that these values of α and β lead P(q) to be a uniform distribution, representing an uninformative prior. As the system encounters more alerts, it updates α and β, thus, maintaining an up-to-date belief about the proportions of urgent alerts that the system might encounter.

Given the gains in utility computed by considering the labeled points and the unlabeled points $J_U$, the expected value of a system (EV S) associated with each incoming alert as the average gain per alert:

$$EVS = \frac{J_{all}}{|\varepsilon_L| + |\varepsilon_U|} \quad \text{Equation 7}$$

The EV S per incoming alert can be converted into an EV S per second, which can represent the rate at which value is being delivered by the system, given the expected rate of incoming alerts.

Following a user response to a probe for the label of the new point, the predictive user model can be refined and a gain in the total expected value that the system would be delivering on each alert might be discovered. However, the cost of the probe should be considered. The difference in the gain and the cost guides the selection of cases to label. Let $C_{new}^{probe}$ be the cost that will be incurred when the user is interrupted by a probe. For simplicity, assume that the cost of the interruption for the probe, similar to the cost of interruption for alerts, only depends upon the user state.

An optimization horizon k defines the duration of system usage considered in the learning optimization. k refers to the number of future alerts that should be handled. This value is selected according to the time frame that the user wishes to optimize over. For example, a user may wish to have the system probe so as to optimize the value of the system over two weeks. k determines the tradeoff between the acute cost of a probe and the long-term benefits associated with the expected improvements of system performance by refining the model using the additional case. A large k value typically causes the system to probe the user a great deal early on, while a small k value might make the system reluctant to ask for supervision. The value of probing ($VOP_k$) the new point $E_{new}$ can be defined as the gain in the total expected value that the system is expected to deliver for the k alerts subtracted by the cost of probing:

$$VOP_k(E_{new}) = k \cdot (EVS_{new} - EVS) - C_{new}^{probe} \quad \text{Equation 8}$$

Here EV $S_{new}$ denotes the total expected value of the system delivered per alert should a label for $E_{new}$ be acquired from the user. The $VOP_k$ quantifies the gain in utility that can be obtained by interrupting the user. Thus, system should be configured to interrupt the user when $VOP_k \geq 0$. This approach is unique because other active learning techniques have focused on minimizing the classification error. It should be noted that this computation of $VOP_k$ assumes stationarity in the distribution of cases and associated patterns of evidences.

The expression for $VOP_k$ should be computed before the label for $E_{new}$ is known. Note that EV $S_{new}$ and $J_{new}$ cannot be computed before the actual label $s_{new}$ is known. Similarly, $C_{new}^{probe}$ cannot be computed as the costs of labels are different for different classes. To address this, $J_{all}^{new}$ for the new data point should be approximated with an expectation of the empirical gain:

$$J_{all}^{new} \approx \int_s J_{all}^{new,s} p(s \mid E_{new}) \quad \text{Equation 9}$$

Here $J_{all}^{new,s}$ is the gain in utility when $E_{new}$ is considered labeled as s. To calculate $J_{all}^{new,s}$, the predictive model can be retrained by considering $E_{new}$ labeled as s in the training set. Similarly, the expectation of $C_{new}$ can be used as the costs of labeling vary with the user state. Thus, given $VOP_k$ for the new point $E_{new}$, the user can be interrupted if $VOP_k \geq 0$. This can help ensure that the system learns continuously while working to minimize interruptions to the user.

An instantiation of the lifelong learning principles for an alert mediation system will now be discussed. Assume that there are two kinds of alerts: urgent (a=1) and non-urgent (a=0). Next, assume there are two kinds of actions the system can take: either deliver the alert (A=1) or hold back (A=0). Further, for simplicity assume that the utility of an alert of type a is a function of its urgency if delivered instantly. That is, $$U(a, A = 1) = \begin{bmatrix} u_{arg} & \text{if } a \text{ is urgent} \\ u_{non} & \text{if } a \text{ is not urgent} \end{bmatrix} \quad \text{Equation 10}$$

It can be assumed that the utility of the message is lost if the system decides to hold back (e.g., U(a, A=0)=0 for any a). However, the system should know if the alert received is urgent or not to make this determination. There are various schemes from classification of personal messages to manual tagging by the sender, which can be used to determine the urgency of the messages. Further, it should be detected whether the user is busy or not, thus, there is $s_i \in \{1, 2\}$, where $s_i=1(s_i=2)$ corresponds to the state that the user is busy (not busy). In this example, a binary classifier can be utilized as the predictive user model. The GP classification can be used as it directly models the predictive conditional distribution p(s|E).

Next, I(s, A) the cost of interruption by taking an action A is defined. When the system holds back (A=0), there is no interruption so (I(a, A=0)=0). However, the cost of interruption is different when the alert is relayed to the user in different states:

$$I(s, A = 1) = \begin{bmatrix} I_{busy} & \text{if the user is busy} \\ I_{non} & \text{if the user is not busy} \end{bmatrix} \quad \text{Equation 11}$$

Usually, $I_{busy} \geq I_{non}$ and it can be assumed that $u_{urg} \geq u_{non}$, which means that the utility of the urgent alerts is greater than the utility of the non-urgent alerts. In situations where $u_{urg} \geq I_{busy} \geq u_{non} \geq I_{non}$, the optimal policy can be to not deliver the alert if the user is busy unless the alert is urgent.

If an alert is non-urgent and the system correctly detects that the user was busy, then by the optimal policy the alert will not be sent to the user and cost of not notifying the user of the alert ($u_{non}$) will be expended. However in the absence of such a system and the predictive user model, the alert is sent to the user and the high cost of interrupting the user when the user is busy ($I_{busy}$) will be expended. Thus, the net gain of the system being: $G_{11}^{non} = I_{busy} - u_{non}$. Here, $G_{ij}^{non}$ denotes the gain in utilities when classifying the user state belonging to class i as j while handling a non-urgent alert. Similarly, consider the scenario when a non-urgent alert was received and the system misclassified the user state as busy when the user was not busy. The system will not deliver the alert; consequently, $G_{21}^{non}=I_{non}-u_{non}$. Note, that in real-world situations usually the cost of interruption when the user is not busy is low; thus $I_{non} \leq u_{non}$ suggesting that $G_{21}^{non} \leq 0$. It should be noted that system can relay all alerts when the user is not busy and can relay all the urgent alerts irrespective of the user state. Consequently, there might be no net gain in utilities for these cases. The system can provide gain in utilities for the alerts that are non-urgent as urgent alerts can be delivered to the user irrespective of the user state. The system can maintain the Beta distribution over the set of urgent and non-urgent messages. Thus, equation 5 above can reduce down to:

$$J_{all} = \frac{\beta}{\alpha+\beta} \cdot \left[ \sum_{i \in L_1} G_{11}^{non} p_i + G_{21}^{non}(1-p_i) \right] \quad \text{Equation 12}$$

Here, $p_i=p(s_i=1|E_i)$, the probability that the user is busy given the evidence $E_i$ and $L_1$ are the indices points labeled as class 1 (busy) by the system. The term $$\frac{\beta}{\alpha+\beta}$$

appears in the equation as the gain that occurs for the non-urgent alerts and allows system to consider the likelihood of receiving a non-urgent alert while computing the total gain $J_{all}$.

Figure 13:
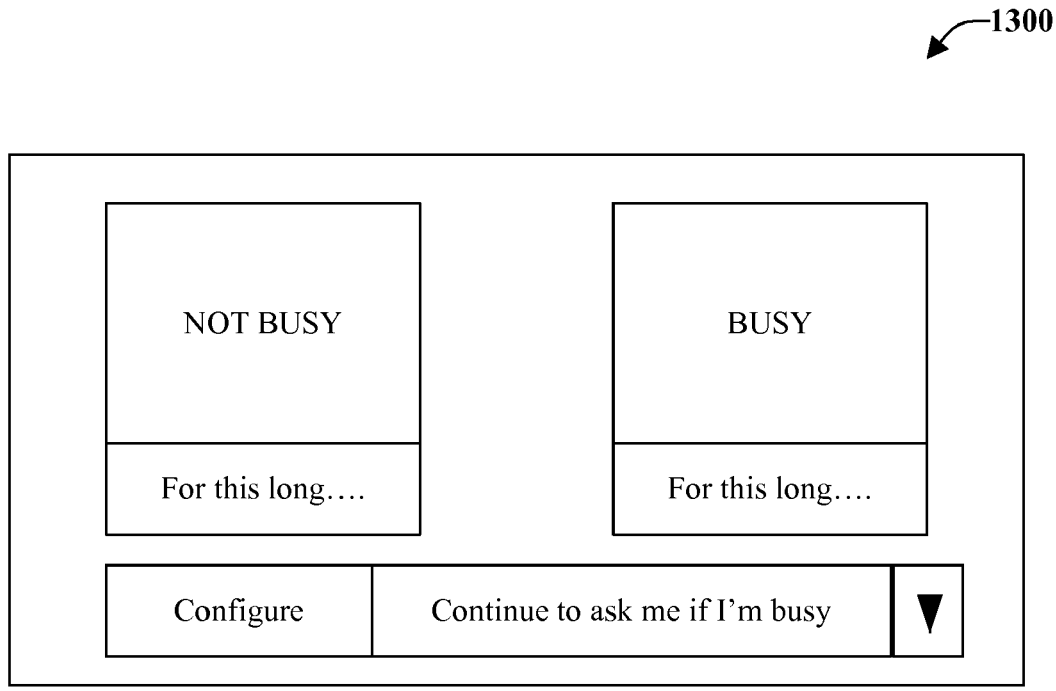
FIG. 13 illustrates a prompt that can be utilized to probe a user.

A prompt can be utilized to probe the user, similar to the prompt 1300 illustrated in FIG. 13. This can be a pop-up prompt 1300 that can be provided to request an assessment of the user's interruptability. When the system is placed in a training mode, the system intermittently probes users with a pop-up form, similar to the prompt 1300 illustrated. The prompt can occur at random times and can be constrained to an overall rate that is set by the user. The cost $C_{new}^{probe}$ that is incurred when the user is interrupted to label the current instance $E_{new}$. It can be assumed that the cost of probing depends upon the user state, that is:

$$C_{new}^{probe} = \begin{bmatrix} C_{busy}^{probe} & \text{if the user is busy} \\ C_{non}^{probe} & \text{if the user is not busy} \end{bmatrix} \quad \text{Equation 13}$$

Thus, principles of lifelong learning can be employed with the disclosed embodiments, wherein training is ongoing over extended periods of a system's use and the best predictive models available to data can be used to guide supervision. Lifelong learning can harness the value of information to make decisions about probing users for states that are not available to system.

Additionally or alternatively, selective supervision learning can be utilized with the disclosed embodiments. Such selective supervision can guide the effort for labeling data to obtain the greatest boosts in discriminatory power with increasing amounts of effort.

In order to fully appreciate the selective supervision learning disclosed herein, basics of Gaussian Process classification will now be presented. A linear classifier parameterized by w classifies a test point x according to: sign(f(x)), where $f(x)=w^T x$. Given a set of training data points $\chi_L=\{x_1, \ldots, x_n\}$, with class labels $\mathcal{T}_L=\{t_1, \ldots, t_n\}$, where $t_i \in \{1, -1\}$. A popular manner of learning the parameters (w) is to solve the Tikhonov regularization:

$$\min_w \lambda \|w\|^2 + \frac{1}{n} \sum_i V(f(x_i), t_i) \quad \text{Equation 14}$$

Here, $\lambda$ is the regularization constant and $V(f(x),t)$ denotes a loss function. Thus, the quantity to be minimized is the regularized empirical loss. SVM is a special case of this framework where the loss function is the hinge loss. For example, $V_{hinge}(f(x),t)=|1-t \cdot f(x)|_+$, where $|k|_+=\max(0,k)$.

Gaussian Process methods provide a popular alternative for classification. With this approach, the goal is to infer the posterior distribution over the set of all possible classifiers given the training set:

$$p(w | \chi_L, \mathcal{T}_L) = p(w) \prod_{i \in L} p(t_i | w, x_i) \quad \text{Equation 15}$$

Here, p(w) corresponds to the prior distribution over the classifiers and usually is selected so as to prefer parameters w that have a small norm. Assuming a spherical Gaussian prior on the weights: $w \sim \mathcal{N}(0, I)$. The prior imposes a smoothness constraint and acts as a regularizer such that it provides higher probability to the labeling that respects the similarity between the data points. The likelihood terms $p(t_i|w, x_i)$ incorporates the information from the labeled data and there can be many different forms of distribution that can be chosen from. A choice can be the probit likelihood: $p(t|w,x)=\Psi(t \cdot w^T x)$. Here $\Psi(\cdot)$ denotes the cumulative density function of the standard normal distribution. Thus, the posterior can have a preference for those parameters that have small norm and are consistent with the training data.

Computing the posterior $p(w|\chi_L, \mathcal{T}_L)$, is non-trivial and approximate interference techniques such as Assumed Density Filtering (ADF) or Expectation Propagation (EP) might be utilized. The intent of ADF is to approximate the posterior $p(w|\chi_L, \mathcal{T}_L)$ as a Gaussian distribution (e.g., $p(w|\chi_L, \mathcal{T}_L) \approx \mathcal{N}(\bar{w}, \Sigma_w)$). Similarly, EP is another approximate interference technique. EP is a generalization of ADF, where the approximation obtained from ADF is refined using an iterative message passing scheme.

Given the approximate posterior $p(w|\chi_L, \mathcal{T}_L) \sim \mathcal{N}(\bar{w}, \Sigma_w)$, the mean $\bar{w}$ of the distribution can be chosen as the point classifier. The mean, which can also be called the Bayes point, classifies a test point according to: $\text{sign}(\bar{w}^T x)$.

Both Tikhonov regularization and the Gaussian Process classification can be extended to non-linear classification by using a process known as a kernel trick. In particular, the prior p(w) can be viewed as a regularizer and the likelihood terms are in correspondence with the loss function. This can hold true for those loss functions, which can induce valid probability distributions.

The above discussed Gaussian Process classification utilizes the weights perspective. Another process perspective that can result by assuming that there exist latent random variables $y=\{y_1, \ldots, y_n\}$ arising due to a Gaussian Process $y=w^T \phi(x)$. Here $\phi(x)$ is the feature expansion and for the linear classification case is simply: $\phi(x)=x$. Assuming a Gaussian prior on the weights w, leads to a distribution over the latent variables y, which is also jointly Gaussian: $y \sim \mathcal{N}(0,K)$. Here $K=[K_{ij}]$ is the kernel matrix defined by the inner products: $K_{ij}=\phi(x_i)^T\phi(x_j)$. It should be noted that linear classifications (e.g., $\phi(x)=x$) have been considered in this discussion. Both the process perspective and the weights perspective are substantially the same and it can be easy to kernelize the Gaussian Process classification to handle non-linear cases.

A byproduct of utilizing the Gaussian Process classification framework can be to also obtain a predictive distribution $p(\text{sign}(f(x))|x)$:

$$p(\text{sign}(f(x)) = 1 | x) = \Psi\left(\frac{\bar{w}^T x}{\sqrt{x^T \sum_w x + 1}}\right) \quad \text{Equation 16}$$

Unlike other classifiers, the Gaussian Process classification models the predictive conditional distribution $p(t|x)$ making it easy to compute the actual conditional probabilities without any calibrations or post-processing. Probabilistic interpretations have been made of other kernel classifiers such as SVM and other attempts that map the output of the classifiers directly to the probability. The disclosed embodiments can use this predictive distribution in an active learning framework to compute expected risks and quantify the value of information.

Most classification techniques focus on minimizing the classification error. However, preferences about the relative numbers of false positives and false negatives associated with a classification system can vary by person and task. Furthermore, in the real-world, these preferences can be expressed in terms of currency and the aim in these scenarios is to minimize the expected cost for the given classification task. Additionally, in the real-world there is a cost to obtain labeled training data, which can vary for different class labels or other problem dependent variables.

The goal is to quantify the value of knowing the label of a data point and use it as a guiding principal in the active learning framework. Knowing the label of one or more currently unlabeled points may assist in mitigating the total risk in the classification task. However, the difference in the reduction in the total expected cost of the use of the classifier, which can be referred to as the risk, and the cost of acquiring a new label and its expected value of information for learning the label.

For simplicity, this discussion will focus on two-class discrimination problems. However, the disclosed methods can be generalized to handle the multiple classes. The risk matrix $R=[R_{ij}] \in \mathbb{R}^{2 \times 2}$, is defined, where $R_{ij}$ denotes the cost or risk associated with classifying a data point belonging to class i as j. The index 2 is used to denote the class label −1. It is assumed that the diagonal elements of R are zero (e.g., there is no cost associated with correct classification).

Assuming that the label set $\mathcal{X}_L$ with labels $\mathcal{T}_L$ is given, an unlabeled set $\mathcal{X}_U=\{x_{n+1}, \ldots x_{n+m}\}$. If f(x) is the classifier trained and the labeled set, the true total risk $J_{all}^{true}$ can be computed on all the labeled and the unlabeled data points.

$$J_{all}^{true} = \sum_{i \in L \cup U} 1_{[f(x_i)=1]} R_{21}(1-p_i^{true}) + 1_{[f(s_i) \neq 1]} R_{12} p_i^{true} \quad \text{Equation 17}$$

Here, $p_i^{true}$, is the true conditional probability that $x_i$, belongs to class+1. since this distribution might not be available, $J_{all}^{true} \approx J_{all}$ can be approximated using the current classification model: $p_i^{true} \approx p_i = p(\text{sign}(f/(x_i))=1|x_i)$. It should be noted that $p_i$ is the predictive distribution already available if the Gaussian Process classification (Equation 16) is being used.

Alternatively, a different approximation can be used by considering the interpretation of $p_i$ as the probability with which $x_i$ is classified as +1. Here the total risk for the labeled and the unlabeled set is decomposed. Specifically, first the total risk on all the labeled data points can be computed as:

$$J_L = \sum_{i \in L_+} R_{12}(1-p_i) + \sum_{i \in L_-} R_{21} p_i \quad \text{Equation 18}$$

Here $L_+$ and $L_-$ are the indices of positively and negatively labeled points respectively. Besides the labeled points, the total risk on the unlabeled data points can be approximated as:

$$J_U = \sum_{i \in U} R_{12}(1-p_i) \cdot p_i^{true} + R_{21} p_i \cdot (1-p_i^{true}) \quad \text{Equation 19}$$

Again, $p_i^{true}$ can be approximated by $p_i$ and thus, an approximation to the total risk on the unlabeled data points can be computed as:

$$J_U \approx \sum_{i \in U} (R_{12} + R_{21})(1-p_i) \cdot p_i \quad \text{Equation 20}$$

Resulting in $J_{all}=J_L+J_U$. Now, let $C_i$ denote the cost of knowing the class label of $x_i$. In this detailed description it will be assumed that the costs $C_i$ and the risks $R_{12}$ and $R_{21}$, are in the same currency. It should be noted that this assumption does not impose constraints as different currencies can be transformed into a single utility by using appropriate conversion according to real world conventions.

Given the total risks on the labeled and unlabeled points $J_{all}$ and the labeling costs, the expected costs associated with a classification system can be computed as the sum of the total risk and the total cost of obtaining the labels for the training data.

$$U = J_{all} + \sum_{i \in L} C_i \quad \text{Equation 21}$$

Upon querying the new point, a reduction in the total risk might be found. However, a cost is incurred when a label is queried and computing the difference in these quantities guides the selection of cases to label. Formally, the value of information (VOI) associated with an unlabeled point $x_j$ is defined as reduction in the total risk subtracted by the cost of obtaining the label:

$$VOI(x_j) = U - U^j = (J_{all} - J_{all}^j) - C_j \quad \text{Equation 22}$$

Here $U^j$ and $J_{all}^j$ denote the total expected cost and the total misclassification risk respectively if $x_j$ is considered labeled. The VOI quantifies the gain in utilities in terms of the real-world currency that can be obtained by querying a point. Therefore, the strategy might be to choose the point that has the highest value of information. This can result in minimization of the total cost U that consists of the total risk in misclassification as well as the labeling cost. It should be noted that this approach differs from the above methods in active learning where the focus was to minimize the classification error.

Now, $x_j$ will be considered for querying. The expression for VOI should be computed before knowing the label for $x_j$ and the total risk $J_{all}^j$ should not be computed before knowing the actual label $t_j$. Consequently, the term $J_{all}^j$ is approximated for the $j^{th}$ data point with an expectation of the empirical risk as: $J_{all}^j \approx p_j J^{j,+} J^{j,-}(1-p_j)$. Here $J_{all}^{j,+}$ and $J_{all}^{j,-}$ denote the total risks when $x_j$ is labeled as class 1 and class -1 respectively.

To calculate these risks, first compute $p^{j,+}$, the resulting posterior probability upon adding $x_j$ as a positively labeled example in the active set, which allows for computing of $J_{all}^{j,+}$, the total risk when $x_j$ is assumed to be positively labeled. Similar computations follow for $J_{all}^{j,-}$, as well. Thus, given the VOI for the unlabeled points, the strategy is to select the point that has the highest value of information:

$$j_{sel} = \underset{j \in U}{\operatorname{argmax}} VOI(x_j) \qquad \text{Equation 23}$$

Figure 14:
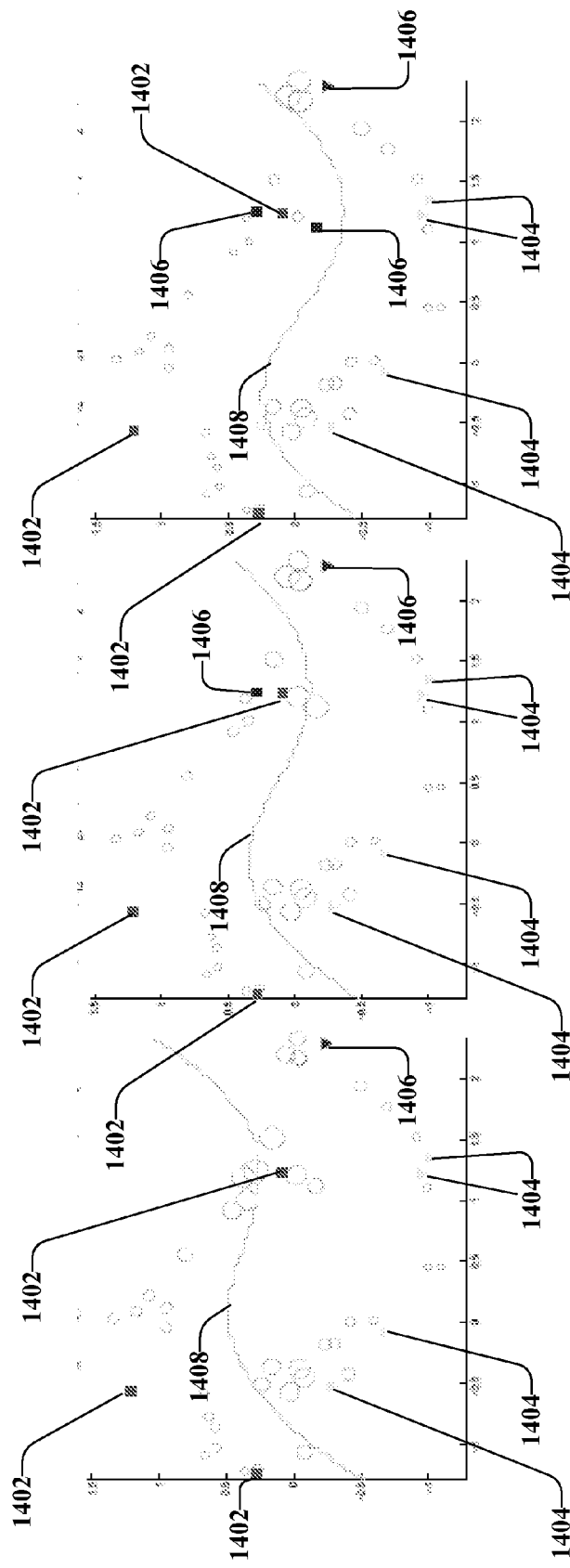
FIG. 14 illustrates when there is no asymmetry in the risks and the labeling costs.
Figure 15:
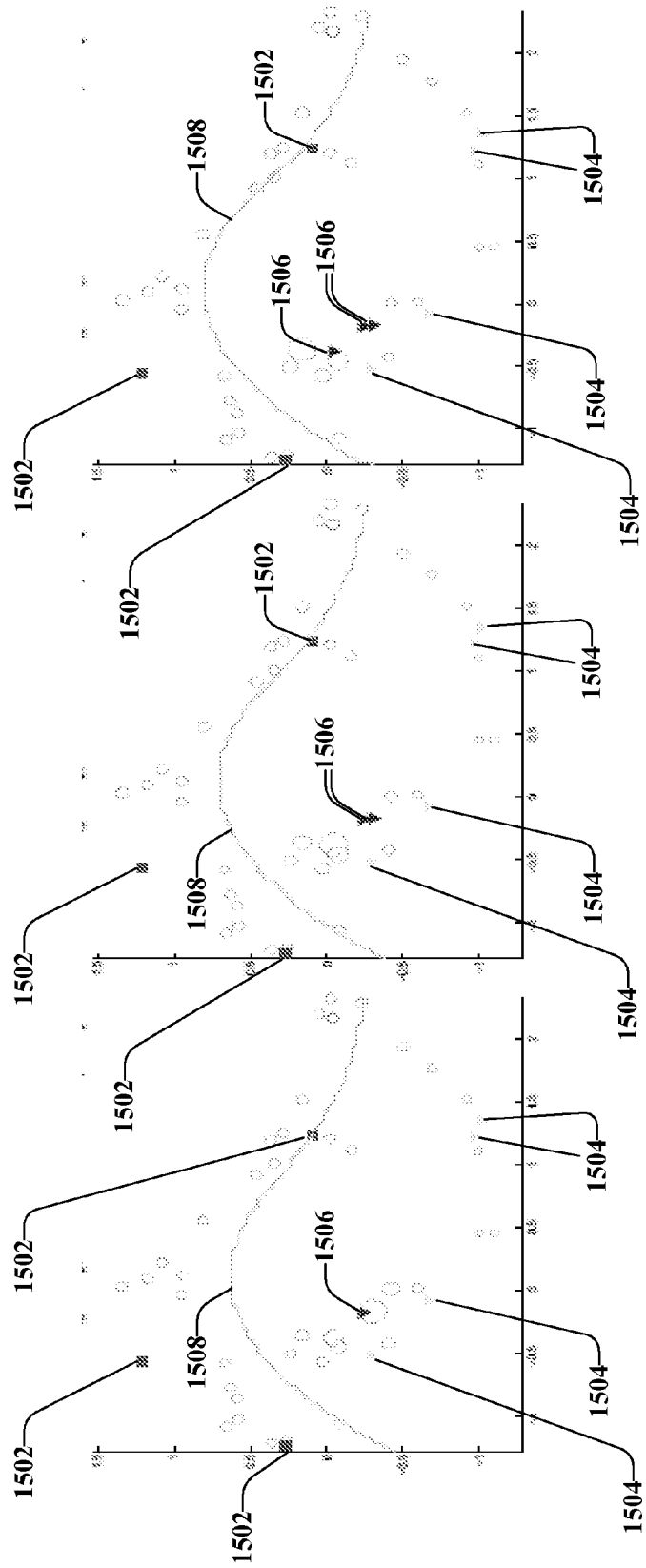
FIG. 15 illustrates when only the risks are asymmetric.
Figure 16:
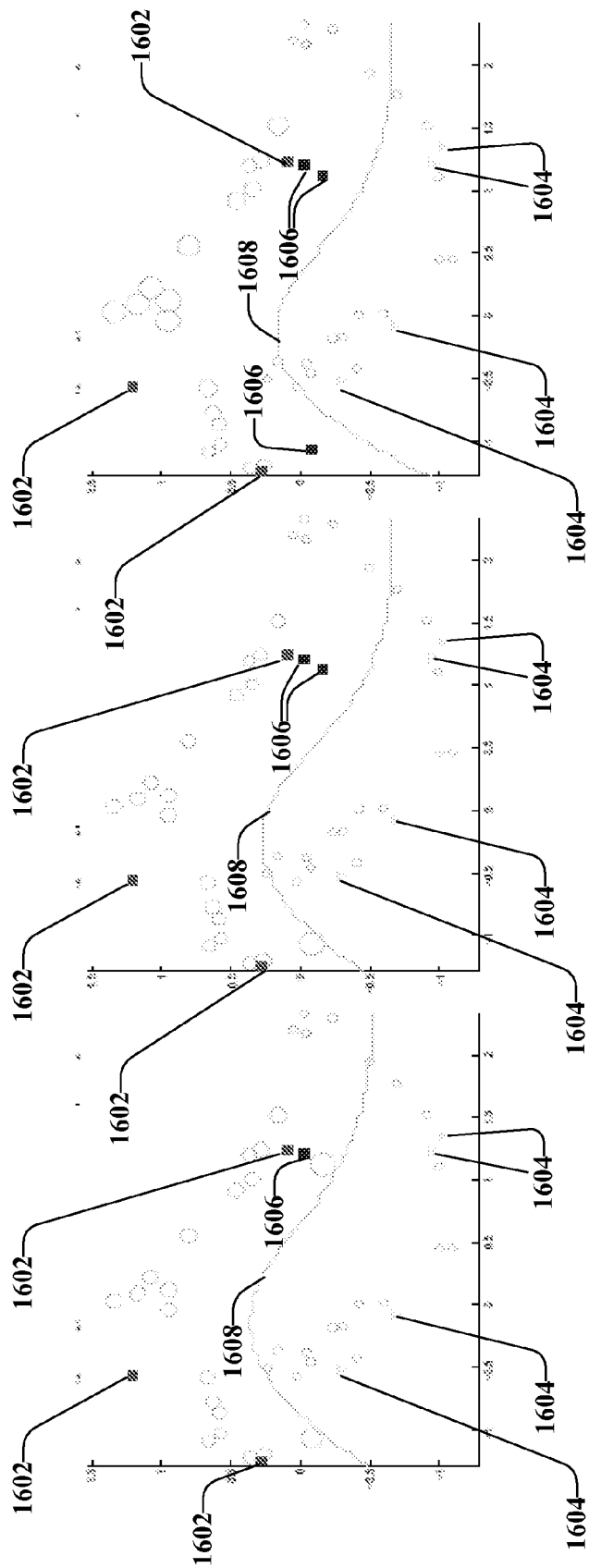
FIG. 16 illustrates when the label costs are asymmetric.

Whenever $VOI(x_{j_{sel}})$ is less than zero, there is a condition where knowing a label does not reduce the total cost. Thus, this situation can be employed as the stopping criterion for the method. FIGS. 14-16 illustrate the selection of unlabeled points to query based on the VOI criterion on a representative, toy data set. The different figures correspond to three cases. FIG. 14 illustrates when there is no asymmetry in the risks and the labeling costs (Equal Risk ($R_{12}=1$, $R_{21}=1$) and Equal Label Cost ($C_1=1$, $C_2=1$)). FIG. 15 illustrates when only the risks are asymmetric (Asymmetric Risk ($R_{12}=1$, $R_{21}=10$) and Equal Label Cost ($C_1=1$, $C_2=1$)). FIG. 16 illustrates when the label costs are asymmetric (Equal Risk ($R_{12}=1$, $R_{21}=1$) and Equal Label Cost ($C_1=1$, $C_2=1.25$)). The columns of each figure correspond to sequential selection of points to label based on the VOI criterion.

The (blue) squares, represented as 1402, 1502, and 1602, (class 1) and the (cyan) triangles, represented as 1404, 1504, and 1604, (class -1) represent points that were already labeled. The (red) squares and triangles, represented as 1406, 1506, and 1606 are the new points selected. The black circles (not labeled) represent the unlabeled points and the radii corresponds to the VOI at that point. The (green) line (1408, 1508, 1608) denotes the decisions boundary based on the available labels.

The sample data consists of two half moons, where the top half of each plot belongs to class one and the bottom half to the class -1. This simulation starts with a few points that are already labeled and are represented as squares (labeled as 1402, 1502, and 1602) for class 1 and triangles (labeled as 1404, 1504, and 1604) for the class -1. The different FIGS. 14, 15 and 16, correspond to different settings of risks ($R_{12}$ and $R_{21}$) and labeling costs. It is assumed that $C^1$ and $C^2$ are the costs for querying points that belong to class +1 and -1 respectively. FIG. 14 illustrates a sequential selection of three points (represented as squares (1402, 1502, and 1602) and triangles, (1404, 1504, and 1604)), when the risks and the cost of labelings are equal for both the classes. The unlabeled points are shown as black circles (unlabelled) and the radii correspond to the VOI of that point. As illustrated in FIG. 14, the points that are nearest to the decision boundary are the ones with the highest VOI. Choosing the points that would minimize the objective for the case of equal risks corresponds to selection of query points that would minimize the classification error; hence, the points at the decision boundary are the one that are the most informative.

FIG. 15 illustrate the case when it is more expensive to misclassify a point belonging to class -1. Due to this asymmetry in risks, the algorithm chooses the three points that belong to class -1 but are also close to the decision boundary. FIG. 16 depicts the case, when obtaining a label for a point in class -1 is twice as expensive to obtain the label for a point belonging to class 1. The VOI is highest for those points that are more likely to belong to class 1, but are close to the decision boundary. Thus, the VOI criterion can be effectively used to guide the supervision such that it minimizes the operation cost as well as the training cost of a classification system.

As discussed above ADF or EP can be utilized to perform approximate inference for the Gaussian Process classification task. However, the proposed scheme for selecting unlabeled points is computationally expensive. The computational complexity for EP is $O(n^3)$, where n is the size of labeled training set. In the proposed method, VOI is computed for every unlabeled data point, thus EP can be performed twice for every point under consideration.

A faster alternative can be to use ADF to compute the approximation of the new posterior over the classifier rather than doing full EP. Specifically, to compute the new posterior $p^{j,+}(w|\mathcal{X}_L \cup_j, \{\mathcal{T}_L \cup +1\})$, compute the Gaussian projection of the old posterior multiplied by the likelihood term for the $j^{th}$ data point. That is $$p^{j,+}(w|\mathcal{X}_{L \cup j}, \{\mathcal{T}_L \cup +1\}) \approx N\left(\overline{w}^{j,+}, \sum_w^{j,+}\right) \text{ where } \overline{w}^{j,+} \text{ and } \sum_w^{j,+}$$

are respectively the mean and the covariance of $p(w|\mathcal{X}_L, \mathcal{T}_L)\cdot\Psi(1\cdot w^T x_j)$. This is substantially the same as performing ADF starting with the old posterior $p(w|\mathcal{X}_L, \mathcal{T}_L)$ and incorporating the likelihood term $\Psi(1\cdot w^T x_j)$ and does not need $O(n^3)$ operations to compute VOI for each unlabeled data point. Similar computations can be utilized to approximate $p^{j,-}(w|\mathcal{X}_L \cup_j, \{\mathcal{T}_L \cup -1\})$.

The underlying classifier above is based on Gaussian Processes and it can be easily extended for the semi-supervised case. Specifically, at the core in the Gaussian Process classification is the kernel matrix K, where entry $K_{ij}$ encodes the similarity between the $i^{th}$ and the $j^{th}$ data points. Rather than using K as the similarity matrix for Gaussian Process classification, the inverse of the transformed Laplacian can be utilized, which is:

$$r(\Delta) = \Delta + \omega I \text{ where } \Delta = D - K$$

Here, D is the diagonal matrix where the diagonal elements are: $D_{ii} = \Sigma_j K_{ij}$ and $\sigma > 0$ is added to remove the zero eigenvalue from the spectrum of $r(\Lambda)$. Instead of computing similarity directly through the kernel $K_{ij}$, the inverse of the transformed Laplacian computes the similarity over a manifold. Thus, the unlabeled data points assist in classification by populating the manifold and using the similarity over the manifold to guide the decision boundary.

For example and not limitation, the selective supervision methods can be employed to build a system that can classify voice mails as urgent/non-urgent, personal/non-personal and to detect if the caller is calling from a mobile phone. This system can be useful for many tasks including prioritizing voice mails, automatically redirecting calls, voice mail summarization, and so forth.

Given voice mail, first features are extracted that can assist in the classification task. Specifically, the prosody and meta level information that accompanies a voice mail are reviewed. The prosodic features can include duration of silence, duration of voiced segment, absolute pitch, length of productive segment, length of pause, change in pitch during productive segments (the foregoing can include max, min, mean and variance) and rate features (e.g., syllable, silence, productive segments, pauses). The meta level information can include information such as "Is Weekend?", "Is AM on a work day?" "Is PM on a work day?" "Is after hours on a work day?", "Size in bytes", "Size in seconds", and "Is external caller?".

There is a large amount of information in prosody. For example, higher syllable rate (e.g., fast production of speech) as opposed to slow speech with many pauses can indicate that the caller is not a close acquaintance. Also, pitch information (e.g., changes, range, and so forth) can indicate a sense of urgency, cues about the emotional state of the caller and other useful information that can be used to classify the voice mails. Given a voice mail, a pitch tracker is ran and the prosodic features can be extracted.

Meta level information can also be extracted from the voice mails. Specifically, from the voice mail features that indicate the day and the time when the voice mail was received can be easily extracted. This information can be useful in distinguishing work related voice mails from personal voice mails. Similarly, the time information can be used to predict calls that are urgent since calls received at certain hours might be expected to be important. Additionally, the size of the voice mail in bytes can be considered as well as the length of the message in seconds. Finally, features that indicate whether the caller is calling within a private organization can be extracted. This feature can be an indicator that the voice mail concerns issues at work.

As illustrated and discussed, the problem of selecting unlabeled points to query based on the value of information criteria has been considered. The risks of misclassification and cost of obtaining labels can be used to quantify the value in terms of utilities of knowing a label of an unlabeled point. Using this value as the guiding principle, the framework based on Gaussian Process classification is applied to the task of classifying voice mails as one example.

Figure 17:
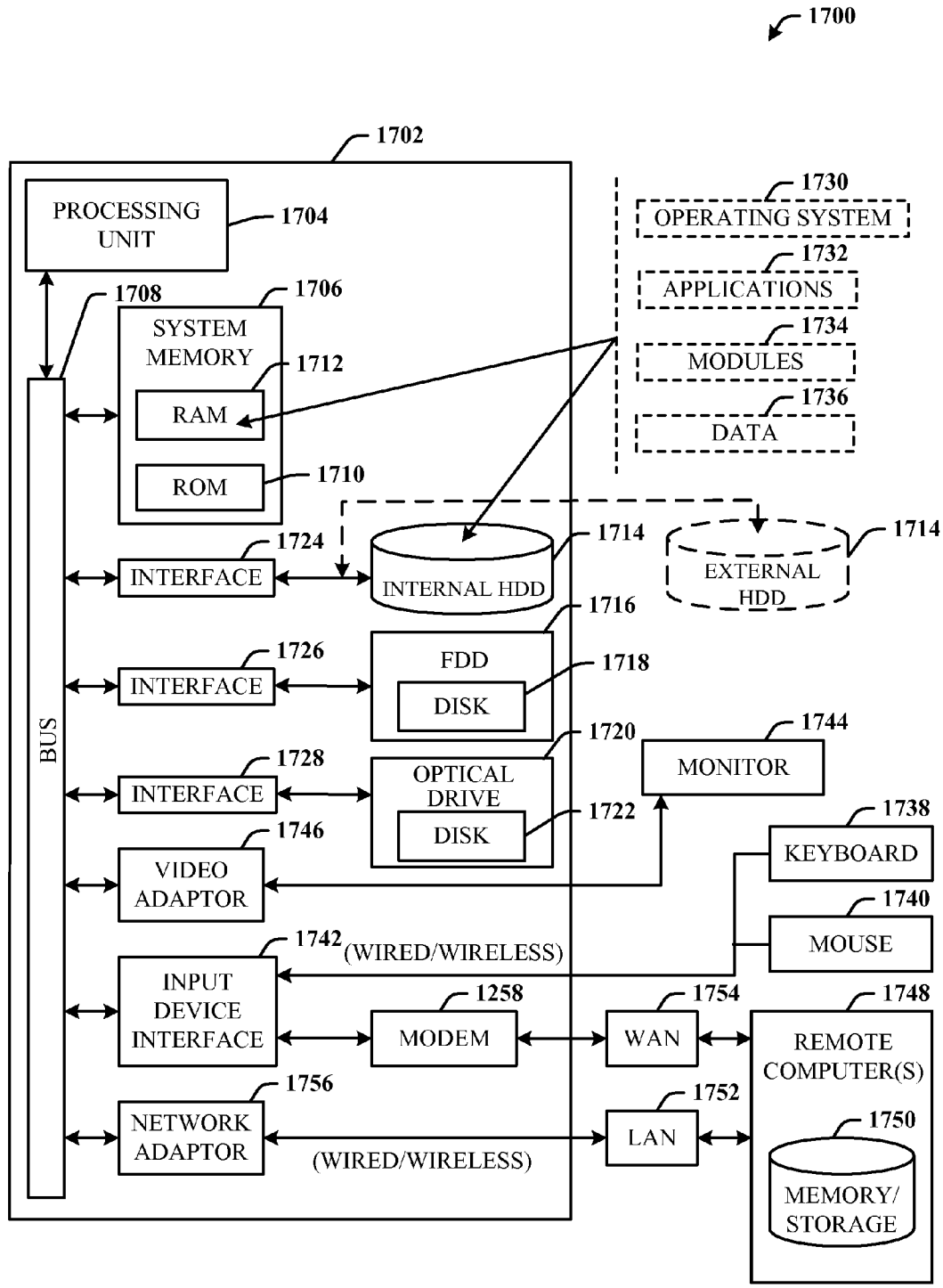
FIG. 17 illustrates a block diagram of a computing system operable to execute the disclosed selective sampling architecture.

Referring now to FIG. 17, there is illustrated a block diagram of a computer operable to execute the disclosed architecture. In order to provide additional context for various aspects thereof, FIG. 17 and the following discussion are intended to provide a brief, general description of a suitable computing environment 1700 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 17, the exemplary environment 1700 for implementing various aspects includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the innovation can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 through an interface, such as a video adapter 1746. In addition to the monitor 1744, a computer typically includes other peripheral output devices (not shown), such as speakers, printers, etc.

The computer 1702 may operate in a networked environment using logical connections through wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adaptor 1756 may facilitate wired or wireless communication to the LAN 1752, which may also include a wireless access point disposed thereon for communicating with the wireless adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 through the serial port interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x(a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 18:
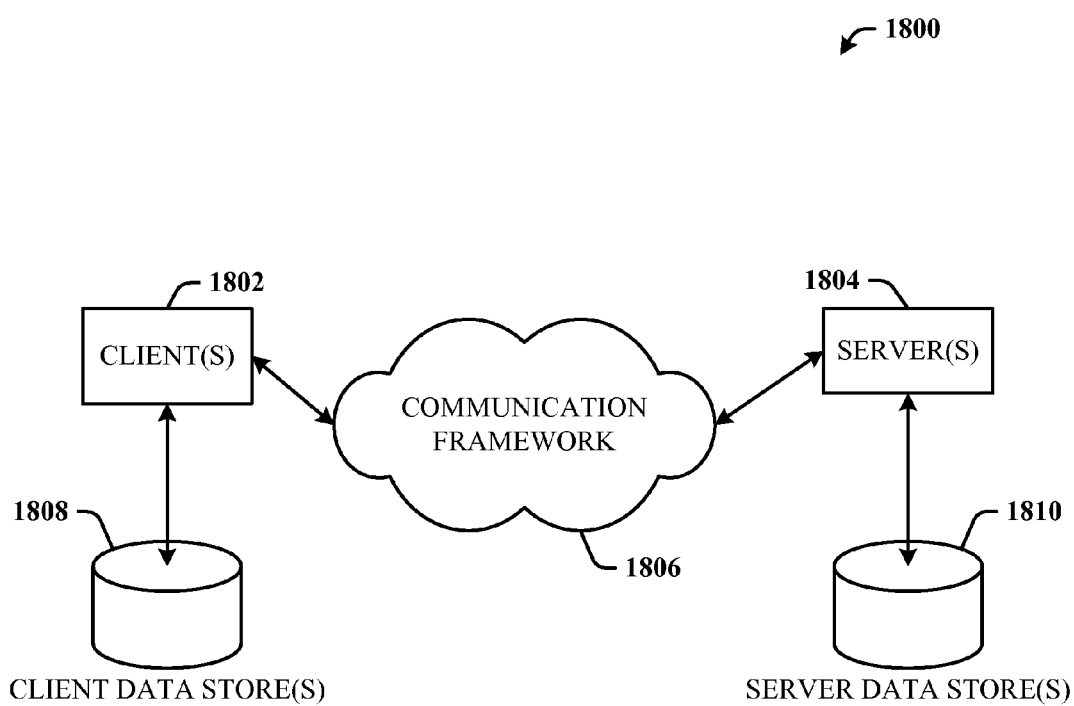
FIG. 18 illustrates a schematic block diagram of an exemplary computing environment operable to be employed for the selective sampling architecture.

Referring now to FIG. 18, there is illustrated a schematic block diagram of an exemplary computing environment 1800 in accordance with another aspect. The system 1800 includes one or more client(s) 1802. The client(s) 1802 can be hardware and/or software (e.g., threads, processes, computing devices). The client(s) 1802 can house cookie(s) and/or associated contextual information by employing the subject innovation, for example.

The system 1800 also includes one or more server(s) 1804. The server(s) 1804 can also be hardware and/or software (e.g., threads, processes, computing devices). The servers 1804 can house threads to perform transformations by employing the disclosed embodiments, for example. One possible communication between a client 1802 and a server 1804 can be in the form of a data packet adapted to be transmitted between two or more computer processes. The data packet may include a cookie and/or associated contextual information, for example. The system 1800 includes a communication framework 1806 (e.g., a global communication network such as the Internet) that can be employed to facilitate communications between the client(s) 1802 and the server(s) 1804.

Communications can be facilitated through a wired (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates model enhancement, comprising:
   at least one processor configured to provide a modeling component that builds and runs a model based on data associated with a user, the model indicating interruptability of the user; and
   a sampling component that determines a time at which to obtain additional data associated with the user for building the model, the data being obtained by probing the user, and the time being determined based on:
   failure analysis of the model; and
   a state of the user.

2. The system of claim 1, wherein the sampling component selectively samples the data further based on expected utility.

3. The system of claim 1, wherein the data is associated with a user situation.

4. The system of claim 1, wherein the data is associated with a user state.

5. The system of claim 1, wherein the sampling component is employed to selectively sample the data when the failure analysis indicates that the model performs below a defined criterion.

6. The system of claim 1, wherein the sampling component initiates sampling of a new set of data when the model performs below a predetermined criterion.

7. The system of claim 6, wherein the new set of data includes data sampled from disparate data sources.

8. The system of claim 7, further comprising a selection component that selects the data that is sampled from the disparate data sources.

9. The system of claim 1, further comprising an analysis component that analyzes results of the model and determines the data over which the model is performing below predefined criteria.

10. The system of claim 1, wherein the data sampled includes data associated with user interaction of a computing system.

11. The system of claim 1, wherein the data sampled includes data associated with user biometrics.

12. The system of claim 1, further comprising a machine learning and reasoning component that employs a probabilistic and/or statistical-based analysis to prognose or infer an action that a user desires to be automatically performed.

13. A computer-implemented method of performing selective sampling of data to enhance model performance, comprising:
   with at least one processor, creating a model of a state of a user based on a set of data;
   testing the model against the set of data to determine performance results; and
   initiating selective sampling to obtain additional data by probing the user when the performance results generated from the set of data are below a criterion, the selective sampling occurring at a time determined based on a state of the user.

14. The method of claim 13, wherein selectively sampling performs direct sampling from the user through one or more prompts requesting the user to classify the user's state of interruptability.

15. The method of claim 13, wherein selectively sampling is performed over disparate data sources of logged information.

16. The method of claim 13, wherein the state of the user is determined based on an invasiveness factor.

17. The method of claim 13, wherein selectively sampling is performed further based on an expected utility.

18. The method of claim 13, further comprising analyzing the set of data to determine a general category of interest of the set of data that forms a basis for the act of initiating selective sampling of the additional data.

19. The method of claim 13, further comprising learning when to perform the act of initiating based on logged data.

20. A computer-executable system that facilitates model enhancement, comprising:
   means, comprising at least one processor, for creating a model of interruptability of a user based on a set of data;
   means for testing the model against the set of data to determine performance results;
   means, comprising a portion of a lifelong learning framework, for initiating selective sampling of additional data by probing the user when:
      the performance results generated from the set of data are below a criterion, and
      an expected improvement in the performance results from the model based on additional data obtained by the probing exceeds an expected cost of interrupting the user with the probing; and
   means for generating a cost of interruption based on the additional data.

* * * * *